US010536035B2

(12) United States Patent
Joye et al.

(10) Patent No.: US 10,536,035 B2
(45) Date of Patent: Jan. 14, 2020

(54) WIRELESS INDUCTIVE POWER TRANSFER

(71) Applicant: KONINKLIJKE PHILIPS N.V., Eindhoven (NL)

(72) Inventors: Neil Francis Joye, Waalre (NL); Klaas Jacob Lulofs, Eindhoven (NL); Eddy Gerrit Veltman, Steenbergen (NL); Andries Van Wageningen, Wijlre (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/772,271

(22) PCT Filed: Nov. 1, 2016

(86) PCT No.: PCT/EP2016/076266
§ 371 (c)(1),
(2) Date: Apr. 30, 2018

(87) PCT Pub. No.: WO2017/076818
PCT Pub. Date: May 11, 2017

(65) Prior Publication Data
US 2018/0366984 A1    Dec. 20, 2018

(30) Foreign Application Priority Data
Nov. 2, 2015    (EP) .................................... 15192520

(51) Int. Cl.
*H02J 50/12*    (2016.01)
*H02J 7/02*    (2016.01)
*H02J 50/80*    (2016.01)

(52) U.S. Cl.
CPC .............. *H02J 50/12* (2016.02); *H02J 7/025* (2013.01); *H02J 50/80* (2016.02)

(58) Field of Classification Search
CPC .. H02J 50/80; H02J 7/025; H02J 5/005; H02J 50/12
See application file for complete search history.

(56) References Cited

U.S. PATENT DOCUMENTS 7,522,878 B2    4/2009    Baarman
2004/0085145 A1    5/2004    Dinn et al.
(Continued)

FOREIGN PATENT DOCUMENTS

| EP | 2475073 A1 | 7/2012 |
| WO | 2005109598 A1 | 11/2005 |
| WO | 2016041880 A1 | 3/2016 |

OTHER PUBLICATIONS

Qi Wireless Power Consortium, https://www.wirelesspowerconsortium.com/index.html, Accessed Apr. 2018.
(Continued)

*Primary Examiner* — Daniel Kessie

(57) ABSTRACT

A wireless power transmitter (101)) comprises a resonance circuit (201) comprises a transmitter inductor (103) for generating a power transfer signal for wirelessly transferring power to the power receiver (105). A driver (203) generates a drive signal for the resonance circuit (201) and a resonance modification circuit (505) aligns the resonance frequency of the resonance circuit (201) with the drive frequency of the drive signal by slowing a state change for resonance circuit (201) for a fractional time interval of cycles of the drive signal. A load estimator (509) generates a load estimate reflecting an equivalent load resistor for the transmitter inductor (103) reflecting the loading of the power transfer signal. A drive frequency adapter (511) then adapts the drive frequency in response to the load estimate. The invention may in particular improve load modulation communication quality.

20 Claims, 20 Drawing Sheets

(56) References Cited

U.S. PATENT DOCUMENTS

| | | |
|---|---|---|
| 2004/0130915 A1 | 7/2004 | Baarman |
| 2011/0278945 A1 | 11/2011 | Wheatley, III et al. |
| 2012/0249097 A1 | 10/2012 | Baarman |
| 2012/0286582 A1* | 11/2012 | Kim .................. H02J 5/005 307/104 |
| 2013/0002038 A1 | 1/2013 | Lee et al. |
| 2014/0184152 A1 | 7/2014 | Van Der Lee et al. |
| 2014/0232201 A1 | 8/2014 | Staring |
| 2014/0347008 A1 | 11/2014 | Chae et al. |
| 2014/0368054 A1 | 12/2014 | Baarman |
| 2015/0061404 A1 | 3/2015 | Lamenza et al. |
| 2015/0155918 A1 | 6/2015 | Van Wageningen |
| 2015/0162785 A1 | 6/2015 | Lee et al. |
| 2016/0105035 A1* | 4/2016 | Venderbosch .......... H02J 50/12 307/104 |

OTHER PUBLICATIONS

N.Y. Kim, K.Y. Kim, J. Choi, and C.-W. Kim, "Adaptive frequency with power-level tracking system for efficient magnetic resonance wireless power transfer," Electronic Letters, vol. 48, No. 8, pp. 434-435, Apr. 12, 2012.

N.Y. Kim, S.-W. Yoon, and C.-W. Kim, "Frequency-agile load-modulated magnetic resonance wireless power transfer system for reliable near-field in-band signaling," Electronic Letters, vol. 49, No. 24., pp. 1558-1559, Nov. 21, 2013.

Qi system description, wireless power transfer, vol. I: low power, part 1: interface definition, Version 1.11, Jun. 2013.

* cited by examiner

WIRELESS INDUCTIVE POWER TRANSFER

CROSS-REFERENCE TO PRIOR APPLICATIONS

This application is the U.S. National Phase application under 35 U.S.C. § 371 of International Application No. PCTEP2016/076266, filed on 1 Nov. 2016, which claims the benefit of European Patent Application No. 15192520.3, filed on 2 Nov. 2015. These applications are hereby incorporated by reference herein.

FIELD OF THE INVENTION

The invention relates to inductive power transfer and in particular, but not exclusively, to a power transmitter providing inductive power transfer using elements compatible with the Qi Specifications for wireless power transfer systems.

BACKGROUND OF THE INVENTION

Most present day systems require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor and a secondary receiver coil. By separating the primary transmitter inductor and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter inductor in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach known as the Qi Specifications has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

Many wireless power transmission systems, such as e.g. Qi, supports communication from the power receiver to the power transmitter thereby enabling the power receiver to provide information to the power transmitter that may allow this to adapt to the specific power receiver or the specific conditions experienced by the power receiver.

In many systems, such communication is by load modulation of the power transfer signal. Specifically, the communication is achieved by the power receiver performing load modulation wherein a load applied to the secondary receiver coil by the power receiver is varied to provide a modulation of the power signal. The resulting changes in the electrical characteristics (e.g. variations in the current of the transmitter inductor) can be detected and decoded (demodulated) by the power transmitter.

Thus, at the physical layer, the communication channel from power receiver to the power transmitter uses the power signal as a data carrier. The power receiver modulates a load which can be detected by a change in the amplitude and/or phase of the transmitter inductor current or voltage.

More information of the application of load modulation in Qi can e.g. be found in chapter 6 of part 1 of the Qi wireless power specification (version 1.0).

Wireless power transmitters constructed according to the Qi v1.1 specification operate in the so-called inductive regime. In this mode, power transfer occurs at tight coupling (coupling factor typically above 0.3) with relatively high efficiency. If a larger distance ("Z-distance") or more positioning freedom of the receiver is desired, power transfer typically occurs in the so-called resonant regime with loose coupling (coupling factor typically below 0.3). In the resonant regime, the resonance frequencies of power transfer resonance circuits at the power transmitter and at the power receiver should match to achieve the maximum efficiency. However, with an increased distance between the resonance circuits, the load modulation communication from power receiver to power transmitter becomes increasingly difficult. In resonant mode, the power transmitter's resonant circuit typically becomes underdamped which makes it sensitive to intermodulation distortion (with the intermodulation being between the resonance frequency of the power transmitter and the drive frequency). Indeed, if the resonance frequency and the drive frequency of the power transmitter do not match, intermodulation frequencies appear, resulting in a degradation in communication performance, and often making the demodulation process at the power transmitter problematic or even impossible.

In order to address the intermodulation problems, it has been proposed to employ a tuneable resonance circuit at the power transmitter, i.e. it has been proposed to use a resonance circuit for which the resonance frequency can be dynamically varied. In such a system, the drive frequency and the resonance frequency of the power transmitter may both be adapted to be the same as the resonance frequency of the power receiver. This may ensure that the system efficiently operates in the resonance mode while at the same time preventing (or at least mitigating) intermodulation effects between the drive frequency and the power transmitter resonance circuit. It may further in many scenarios allow the system to adapt and compensate for variations and tolerances of component values etc. An example of a system setting the frequencies of the drive signal, the transmitter resonance frequency and the receiver resonance frequency to the same value is provided in US20040130915A1.

However, it has been found that the approach also introduces some issues. Firstly, in some systems, the transmitted power level is adapted by changing the drive frequency (i.e. power control may be implemented using adjustments of the drive frequency). However, if the frequencies are locked together, this is no longer a feasible option. Instead, the power level is typically controlled by the amplitude or duty cycle of the drive signal. Furthermore, it has been found that communication performance is still not optimal, and indeed that it may in some scenarios be significantly degraded, and potentially reliable communication performance may not be possible.

An improved power transfer approach would accordingly be advantageous. In particular, an approach that allows improved operation, improved power transfer, increased flexibility, facilitated implementation, facilitated operation, improved communication, reduced communication errors, improved power control, improved power transfer, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for inductively transferring power to a power receiver, the power transmitter comprising: a resonance circuit comprising a capacitive impedance and an inductive impedance, the inductive impedance comprising a transmitter inductor for generating a power transfer signal for wirelessly transferring power to the power receiver; a driver generating a drive signal for the resonance circuit, the drive signal having a drive frequency; a resonance modification circuit for aligning the resonance frequency of the resonance circuit with the drive frequency by slowing a state change for at least one of the capacitive impedance and the inductive impedance for a fractional time interval of each of at least a plurality of cycles of the drive signal; a load estimator for generating a load estimate reflecting an equivalent load resistor for the transmitter inductor reflecting a loading of the power transfer signal; and a drive frequency adapter for adapting the drive frequency in response to the load estimate; wherein the drive frequency adapter is arranged to adapt the drive frequency to be further away from a resonance frequency of a power receiving resonance circuit of the power receiver for a load estimate indicative of a first equivalent parallel load resistance than for a load estimate indicative of a second equivalent parallel load resistance, the first equivalent parallel load resistance being lower than the second equivalent parallel load resistance.

The invention may provide improved performance in many wireless power transfer systems. It may provide facilitated and/or improved adaptation of a power transmitter operation to provide improved load modulation while maintaining attractive power transfer efficiency. The approach may, in many embodiments, allow power transmitters to adapt to dynamic load variations without resulting in unacceptably degraded communication.

In many scenarios, the approach may provide improved load modulation. Indeed, in many embodiments, improved power transfer, and especially improved power transfer efficiency, can be achieved while still providing reliable communication based on load modulation of the power signal.

The approach of aligning the resonance frequency by slowing a state change may facilitate and/or improve the alignment/linking of the drive frequency and the (effective) resonance frequency of the transmitter power transfer resonance circuit. The approach may provide improved power efficiency.

The approach may provide reduced complexity and/or facilitated operation and/or implementation in many scenarios. Specifically, the power transmitter can control the resonance modification circuit based on the drive signal and an adaptation of the drive signal may automatically result in the adaptation of the resonance frequency. In many embodiments, the alignment may be such that the operating frequency and the resonance frequency are intrinsically linked together, and specifically they may be linked such that they are (e.g. continuously) the same. The alignment to the drive signal may specifically obviate or reduce the need for measurements of signals such as currents or voltages of the resonance circuit.

The approach may for example improve load modulation communication. The Inventors have specifically realized that intermodulation distortion can degrade load modulation communication but that this can be effectively mitigated by controlling and linking the resonance frequency of a power transmitter and the operating frequency of the drive signal. The invention may e.g. provide reduced intermodulation distortion by linking the drive signal and the resonance frequency via the synchronization/alignment of the fractional time intervals to the drive signal thereby allowing the operating frequency and the resonance frequency to be locked together.

The Inventors have further realized that the linking/alignment of the drive frequency and the resonance frequency may in some scenarios result in load modulation degradation. The Inventors have specifically realized that this may be mitigated, or possibly prevented by, in such a system, adapting the drive frequency in dependence on the equivalent load resistance.

The drive frequency adapter may control a detuning between the drive frequency (and consequently the aligned resonance frequency of the resonance circuit) and the power receiver resonance frequency, where the detuning is dependent on the load estimate. The drive frequency adapter may be arranged to increase the detuning for decreasing equivalent parallel load resistance, i.e. for a higher extracted power.

The drive frequency adapter may be arranged to increase the frequency offset between the drive frequency (and consequently the aligned resonance frequency of the resonance circuit) and the power receiver resonance frequency for decreasing equivalent parallel load resistance. Thus, the offset or detuning is increased as the power load (the extracted power) increases. This is counterintuitive as it will tend to decrease efficiency and lead to higher relative losses for higher power loads. However, the Inventors have realized that the approach may substantially improve communication performance, and indeed may in many scenarios prevent critical communication performance potentially enabling communication to be possible when it otherwise would not be. The resonance frequency of a power receiving resonance circuit of the power receiver may be stored as a property (data) in the power transmitter or may e.g. be determined by measurements by the power transmitter (such as e.g. by measuring power output as a function of varying frequency).

The drive frequency adapter may be arranged to increase an offset between the drive frequency and the resonance frequency of the power receiving resonance circuit for a decreasing equivalent parallel load resistance. In some embodiments, the drive frequency adapter may be arranged to determine a difference or offset between the drive frequency and the resonance frequency of the power receiving resonance circuit as a monotonically decreasing function of the equivalent parallel load resistance as indicated by the load estimate.

The drive frequency adapter may be arranged to calculate a drive frequency in response to the load estimate, and to control the driver to set the drive frequency to the calculated drive frequency. The calculation may determine the calculated drive frequency to deviate further from the resonance frequency of the power receiving resonance circuit for the first equivalent parallel load resistance than for the second equivalent parallel load resistance (i.e. lower equivalent parallel load resistance/higher power load results in a calculated drive frequency deviating more from the power receiver resonance than for a higher equivalent parallel load resistance/lower power load).

The slowing of the state change may be a slowing relative to a resonance circuit including only the capacitive impedance and the inductive impedance. Such a circuit may have a (free running) resonance frequency (referred to as the natural resonance frequency) which is higher than the effective resonance frequency resulting from the state change being slowed. The capacitive impedance and the inductive impedance may typically be coupled in a series or parallel resonance configuration. The state may specifically be an energy state, and specifically may be a voltage across the capacitive impedance and/or a current through the inductive impedance.

The fractional time interval has a duration which is less than half a time period of the drive signal. The start time and end times may typically be time instants relative to a time instant/event of each cycle (in which a fractional time interval is present). For example, the start time and end time may be considered relative to a zero crossing of the drive signal.

The fractional time interval may specifically be a time interval occurring in a plurality of (but not necessarily all or consecutive) cycles of the drive signal and having a duration of less than a cycle/time period of a cycle of the drive signal.

The capacitive impedance may typically be a capacitor and the inductive impedance may typically be an inductor. However, in some embodiments, the capacitive impedance and/or the inductive impedance may e.g. also include a resistive component.

The resonance frequency may typically be increasingly reduced the longer the duration of the fractional time interval. The frequency modification circuit may reduce a natural resonance frequency of the capacitive impedance and the inductive impedance (corresponding to a frequency at which they would oscillate in a resonance circuit consisting of only the capacitive impedance and the inductive impedance). The effective resonance frequency may in many embodiments be changed by the power transmitter increasing the duration of the fractional time interval, e.g. by changing the start time and/or end time for the fractional time interval.

In some embodiments, the power transmitter may be arranged to reduce the resonance frequency by increasing the duration of the fractional time interval.

The equivalent load resistor may correspond to the resistive component of an equivalent circuit for the transmitter inductor reflecting the loading of the power transfer signal, i.e. reflecting the (resistive or real) power being extracted from the power transfer signal.

The equivalent load resistance may specifically be determined as equivalent parallel load resistance or an equivalent series load resistance (or potentially as a combination). Such parameters are equivalent and have a reciprocal relationship to each other, the equivalent parallel load resistance increases for decreasing power being extracted from the power transfer signal, whereas the equivalent series load resistance increases for increasing power being extracted from the power transfer signal.

The alignment of the drive frequency and the resonance frequency may specifically adapt the resonance frequency to be the same as the drive frequency.

In accordance with an optional feature of the invention, a loading of the power transfer signal has a resistive component and a reactive component, and the load estimate is indicative of only the resistive component.

This may provide improved performance in many embodiments, and specifically may (in many scenarios) provide improved load modulation communication for dynamically varying loads.

In accordance with an optional feature of the invention, the power transmitter further comprises a receiver for detecting messages load modulated onto the power transfer signal by a varying reactive load.

The invention may provide improved load communication in many systems wherein a power transmitter resonance frequency is modified to be aligned to a drive frequency by a slowing of a state change of a resonating component.

In accordance with an optional feature of the invention, the drive frequency adapter is arranged to determine an operating range for the drive frequency in response to the load estimate and to restrict the drive frequency to the operating range.

This may provide improved and/or facilitated operation in many embodiments. Specifically, it may in many embodiments ensure acceptable load modulation communication for many (or all) operating scenarios while still allowing relatively independent optimization based on other parameters.

In accordance with an optional feature of the invention, the drive frequency adapter is arranged to adapt the drive frequency within the operating range in response to an operating parameter other than the load estimate.

This may often provide an effective, and typically dynamic, trade-off between the desire to guarantee effective load modulation based communication in different scenarios, and the desire to optimize operation based on power transfer considerations.

In accordance with an optional feature of the invention, the drive frequency adapter is arranged to operate a feedforward adaptation of the drive frequency in response to load estimate, and to operate a control loop adaptation of the drive frequency in response to an operating parameter other than the load estimate.

This may provide improved performance in many scenarios. Typically, it may allow or facilitate a very fast adaptation to allow load modulation to be maintained even for very fast power receiver load changes while at the same time allowing reliable and effective optimization for slower (or no) load changes. The operating parameter may specifically be a parameter indicative of a property of the power transfer operation. The operating parameter may for example be one or more of modulation depth estimate and a power loss of the resonance circuit.

In accordance with an optional feature of the invention, the drive frequency adapter is further arranged to adapt the drive frequency in response to a power loss of the resonance circuit.

This may provide improved performance in many embodiments, and may specifically provide a more efficient and/or safer operation.

In accordance with an optional feature of the invention, the power transmitter further comprises a modulation depth estimator for determining a modulation depth estimate for a load modulation of the power transfer by the power receiver; and wherein the drive frequency adapter is further arranged to adapt the drive frequency in response to a modulation depth estimate.

This may provide improved performance in many embodiments, and may specifically provide improved communication performance.

In accordance with an optional feature of the invention, the drive frequency adapter is arranged to adapt the drive frequency to be further away from a resonance frequency of the capacitive impedance and inductive impedance for a load estimate indicative of a first equivalent parallel load resistance than for a load estimate indicative of a second equivalent parallel load resistance, the first equivalent parallel load resistance being higher than the second equivalent parallel load resistance.

This may provide improved performance in many embodiments, and may specifically provide improved trade-off between the desire for improved communication performance and more efficient power transfer.

In accordance with an optional feature of the invention, the power transmitter further comprises a receiver for receiving messages from the power receiver comprising load indications being indicative of a resistive loading of the power transfer signal by the power receiver, and wherein the load estimator is arranged to determine the load estimate in response to the messages.

This may provide improved performance and/or facilitated implementation and/or operation.

In accordance with an optional feature of the invention, a resonance frequency corresponding to the capacitive impedance and the inductive impedance exceeds a maximum allowable resonance frequency for the power receiver.

This may provide improved performance and/or facilitated implementation and/or operation.

In accordance with an optional feature of the invention, the drive frequency adapter is arranged to set the drive frequency such that a difference between the drive frequency and a resonance frequency corresponding to the capacitive impedance and inductive impedance is above a first value when the load estimate is indicative of an equivalent parallel load resistance above a first threshold and to set the drive frequency such that the difference is below a second value for the load estimate being indicative of an equivalent parallel load resistance below a second threshold, the first value being higher than the second value and the first threshold being higher than the second threshold.

This may provide improved performance in many embodiments, and may specifically provide improved trade-off between the desire for improved communication performance and more efficient power transfer.

In accordance with an optional feature of the invention, the drive frequency adapter is arranged to adapt the drive frequency in response to the load estimate during a power transfer (phase).

The approach may provide efficient power transfer and efficient load modulation communication by dynamically adapting the drive frequency during the power transfer phase.

In many embodiments, the drive frequency adapter may be arranged to dynamically adapt the drive frequency in response to variations in loading of the power transfer signal (typically by the power receiver) as indicated by the load estimate during a power transfer. The drive frequency adapter may be arranged to change the drive frequency during a power transfer phase in response to the load estimate indicating that a power extracted by the power receiver has changed.

The approach may allow the power transmitter to dynamically adapt the drive frequency, and typically the resonance frequency of the resonance circuit via the linking provided by the slowing of the state change, as the power extraction by the power receiver varies. This may allow the system to dynamically adapt the operation to simultaneously provide both efficient power transfer as well as efficient load communication performance (by adapting to provide sufficient modulation depth).

In the power transfer phase, the power control may be performed based on power control messages, i.e. the dynamic power control operation based on power control messages from the receiver may be active.

According to an aspect of the invention there is provided a wireless power transfer system comprising power transmitter and a power receiver, the power transmitter comprising: a resonance circuit comprising a capacitive impedance and an inductive impedance, the inductive impedance comprising a transmitter inductor for generating a power transfer signal for wirelessly transferring power to the power receiver; a driver generating a drive signal for the resonance circuit, the drive signal having a drive frequency; a resonance modification circuit for aligning the resonance frequency of the resonance circuit with the drive frequency by slowing a state change for at least one of the capacitive impedance and the inductive impedance for a fractional time interval of each of at least a plurality of cycles of the drive signal; a load estimator for generating a load estimate reflecting an equivalent load resistor for the transmitter inductor reflecting a loading of the power transfer signal; and a drive frequency adapter for adapting the drive frequency in response to the load estimate; wherein the drive frequency adapter is arranged to adapt the drive frequency to be further away from a resonance frequency of a power receiving resonance circuit of the power receiver for a load estimate indicative of a first equivalent parallel load resistance than for a load estimate indicative of a second equivalent parallel load resistance, the first equivalent parallel load resistance being lower than the second equivalent parallel load resistance.

In some embodiments, a resonance frequency of the capacitive impedance and the inductive impedance exceeds a resonance frequency of a resonance circuit of the power receiver comprising a power receive coil for extracting power from the power transfer signal by no less than 20 kHz.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
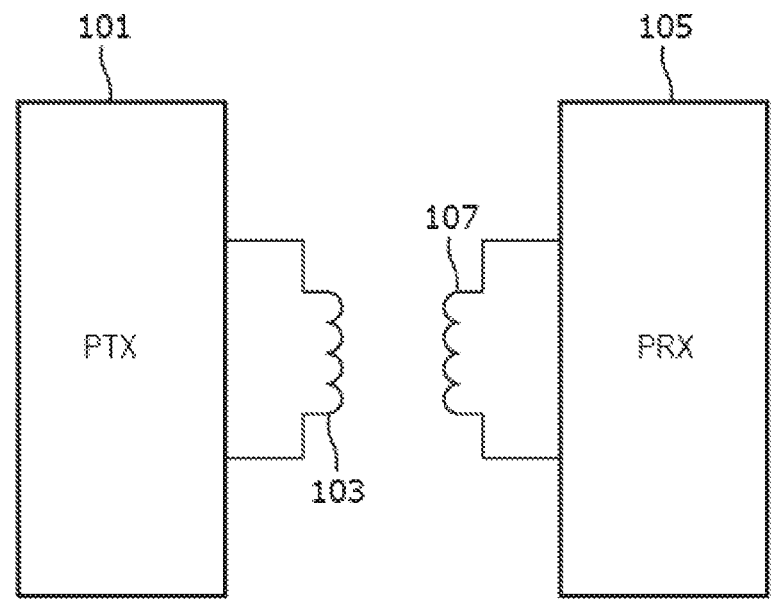
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter inductor/inductor 103. The system further comprises a power receiver 105 which includes (or is coupled to) a receiver coil/inductor 107.

The system provides a wireless inductive power transfer from the power transmitter 101 to the receiver 105. Specifically, the power transmitter 101 generates a wireless inductive power transfer signal (also referred to as a power transfer signal, power transfer signal or an inductive power transfer signal), which is propagated as a magnetic flux by the transmitter inductor 103. The power transfer signal may typically have a frequency between around 70 kHz to around 150 kHz, and often for Qi compatible systems typically in the range from 95 kHz to 115 kHz. The transmitter inductor 103 and the receiver coil 107 are loosely coupled and thus the receiver coil 107 picks up (at least part of) the power transfer signal from the power transmitter 101. Thus, the power is transferred from the power transmitter 101 to the power receiver 105 via a wireless inductive coupling from the transmitter inductor 103 to the receiver coil 107. The term power transfer signal is mainly used to refer to the inductive signal/magnetic field between the transmitter inductor 103 and the receiver coil 107 (the magnetic flux signal), but it will be appreciated that by equivalence it may also be considered and used as a reference to an electrical signal provided to the transmitter inductor 103 or picked up by the receiver coil 107.

The system is arranged to transfer substantial power levels, and specifically the power transmitter may support power levels in excess of 500 mW, 1 W, 5 W, or 50 W in many embodiments. For example, for Qi corresponding applications, the power transfers may typically be in the 1-5 W power range for low power applications, and in excess of 100 W and up to more than 1000 W for high power applications, such as e.g. kitchen applications.

Figure 2:
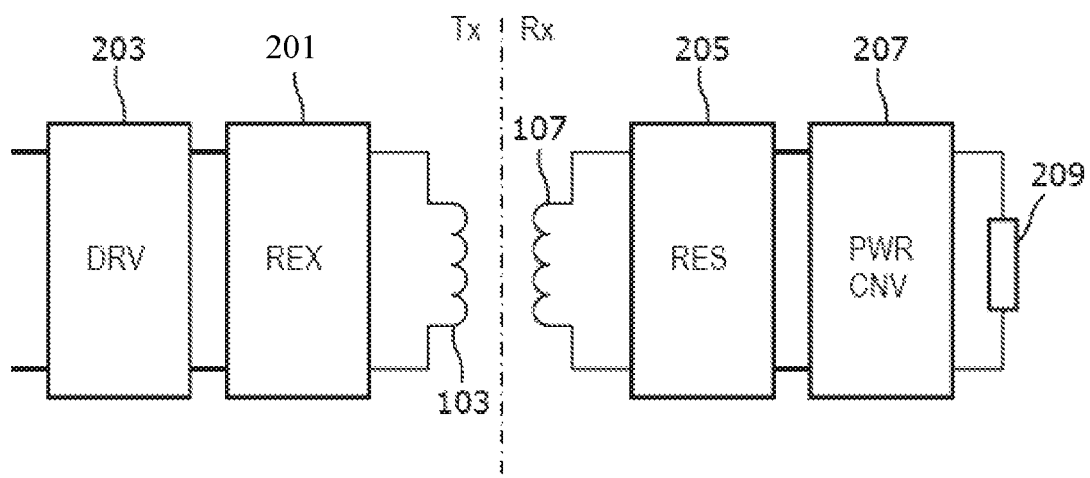
FIG. 2 illustrates an example of elements of a power transfer system in accordance with some embodiments of the invention.

FIG. 2 illustrates the system architecture of a specific example of the system of FIG. 1 in a bit more detail. In this example, the output circuit of the power transmitter 101 includes a resonance tank or resonance circuit 201, which includes the transmitter inductor 103 (in FIG. 2, the transmitter inductor 103 is for clarity shown external to the resonance circuit 201 but is considered to be part of this). The resonance circuit 201 of the power transmitter 101 will also be referred to as the transmitter resonance circuit 201. The resonance circuit 201 may typically be a serial or parallel resonance circuit, and may in particular consist of a resonance capacitor coupled in parallel (or in series) to the transmitter inductor 103. The power transfer signal is generated by driving the output resonance circuit from a driver 203 generating a drive signal with a suitable drive frequency (typically in the 20-200 kHz frequency range).

Similarly, the input circuit of the power receiver 105 includes a resonance circuit or resonance tank 205 which includes the receiver inductor 107 (in FIG. 2, the receiver inductor 107 is for clarity shown external to the resonance circuit 205 but is considered to be part of this). The resonance circuit 205 of the power receiver 105 will also be referred to as the receiver resonance circuit 205 or the receiver resonance circuit. The receiver resonance circuit 205 may typically be a serial or parallel resonance circuit, and may in particular consist of a resonance capacitor coupled in parallel (or series) to the receiver inductor 107. The receiver resonance circuit 205 is coupled to a power converter 207 which converts the received power transfer signal, i.e. the induced signal provided by the receiver resonance circuit 205, into a power that is provided to an external load 209 (typically by performing AC/DC conversion as will be well known to the skilled person).

The load may for example be a battery and the power provision may be in order to charge the battery. As another example, the load may be a separate device and the power provision may be in order to power this device.

In the system, the resonance circuit 201 of the transmitter resonance circuit 201 is not a fixed resonance circuit but rather is a variable resonance circuit that is controlled to follow the drive frequency. Specifically, an approach may be used for adapting the effective resonance frequency of the resonance circuit 201. In the approach, the dynamic state changes for at least one of the (resonating) components of the resonance circuit 201 are temporarily slowed (including potentially being completely stopped) for a fraction of the cycle. The approach will be described in more detail later.

The driver 203 of FIG. 2 generates a varying (and typically AC) voltage drive signal which is applied to the resonance circuit (and thus to the resonance capacitor (not shown in FIG. 2) and transmitter inductor 103). In some embodiments, the transmitter resonance circuit 201 may be a series resonance circuit, and the voltage drive signal may be applied across the capacitor and inductor. In some embodiments, the driver 203 may be coupled directly (or indirectly) to the transmit coil 103 and the voltage drive signal may be provided to the transmit coil 103.

Thus, in the system, the driver 203 generates a drive signal which is fed to the transmitter resonance circuit 201/transmit coil 103, causing the transmit coil 103 to generate the power transfer signal providing power to the power receiver 105. The drive signal is generated to have a given frequency referred to as the drive frequency, i.e. the drive frequency is the frequency of the drive signal.

Figure 3:
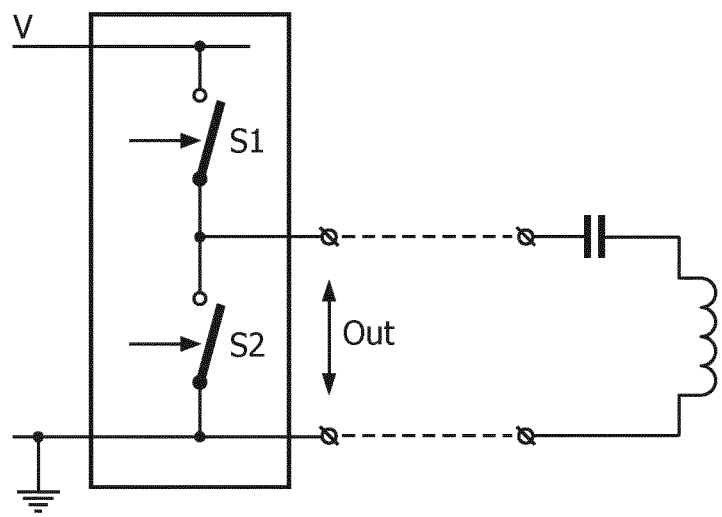
FIG. 3 illustrates an example of elements of a half-bridge inverter for a power transmitter in accordance with some embodiments of the invention.
Figure 4:
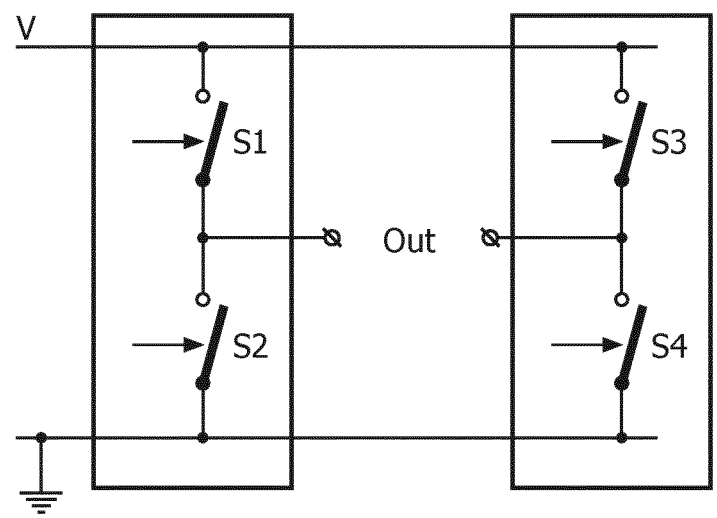
FIG. 4 illustrates an example of elements of a full-bridge inverter for a power transmitter in accordance with some embodiments of the invention.

The driver 203 generates the current and voltage which is fed to the transmitter inductor 103. The driver 203 is typically a drive circuit in the form of an inverter which generates an alternating signal from a DC Voltage. The output of the driver 203 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are open and closed with the desired frequency.

The driver 203 accordingly generates a drive signal with a given drive frequency and applies this signal to the transmitter resonance circuit 201. The transmitter resonance circuit 201 is formed by an inductive impedance and a capacitive impedance.

In the system of FIGS. 1 and 2, a particularly advantageous way of controlling the resonance frequency is provided. In the approach, the power transmitter comprises functionality for aligning the resonance frequency of the transmitter resonance circuit 201 with the drive frequency by slowing a state change for at least one of a capacitive impedance and an inductive impedance of the transmitter resonance circuit 201 for a fractional time interval of each of at least a plurality of cycles of the drive signal. Thus, in the approach, the transmitter resonance circuit 201 is not allowed to freely oscillate at the natural frequency given by the capacitive impedance and the inductive impedance but rather the resonating is controlled by the state change of (at least one of) the impedances being slowed (specifically stopped) for a part of the cycle. This results in a reduced effective resonance frequency of the transmitter resonance circuit 201. Thus, the transmitter resonance circuit 201 is controlled to have an effective resonance frequency which is lower than the natural resonance frequency given by the impedances, i.e. by a frequency which is lower than $$f_n = \frac{1}{2\pi\sqrt{LC}}$$

where L and C represents the combined inductance and capacitance of the transmitter resonance circuit 201.

In the specific approach, the transmitter resonance circuit 201 is controlled in dependence on the drive signal driving the transmitter resonance circuit 201 thereby inherently allowing the operating frequency and the transmitter resonance frequency to be automatically linked together. Indeed, the approach allows the operating frequency and transmitter resonance frequency to automatically and inherently be substantially the same such that the system can simply adapt the operating frequency of the drive signal with the effective transmitter resonance frequency automatically and inherently being adapted to directly follow. The approach can specifically ensure that each cycle of the effective resonance of the transmitter resonance circuit 201 has the same duration as the corresponding cycle of the drive signal. In addition, the approach allows for this to be achieved with very low additional complexity and with a very low control overhead.

Figure 5:
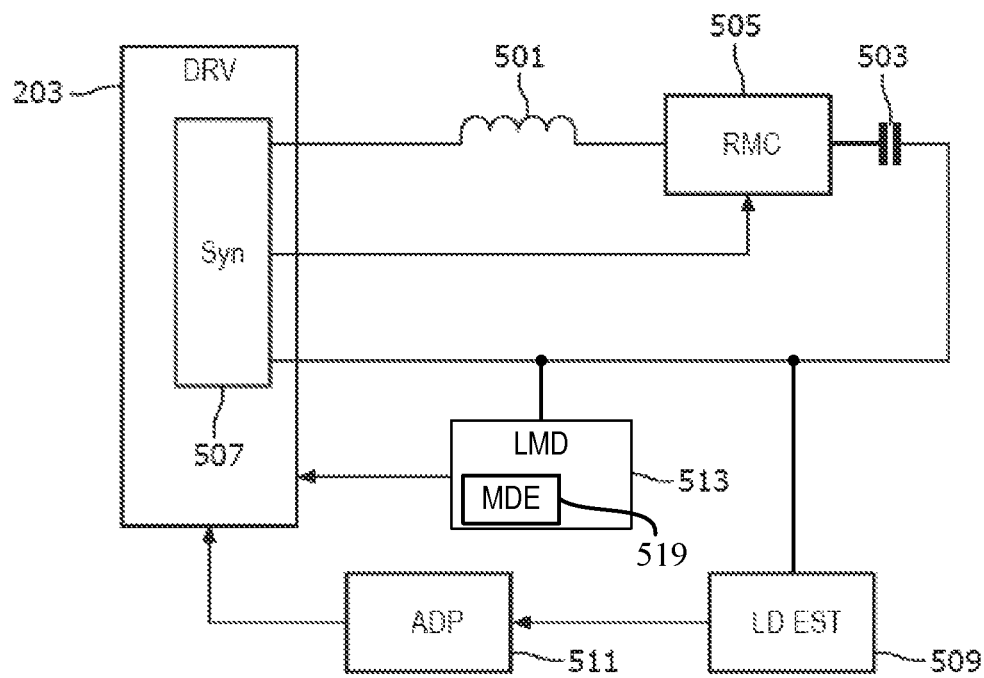
FIG. 5 illustrates an example of elements of a power transmitter in accordance with some embodiments of the invention.

FIG. 5 illustrates elements of a power transmitter in accordance with an example of such an approach.

In the example, the power transmitter comprises an inductive impedance 501 and a capacitive impedance 503 forming a resonance circuit.

In the specific example, the inductive impedance 501 corresponds directly to an inductor but it will be appreciated that in other embodiments the inductive impedance 501 may be any e.g. one port/two-terminal element which has an at least partial inductive impedance, i.e. which has an inductive reactance component, or in other words which has a complex impedance with a positive imaginary part. Thus, the inductive impedance 501 may be a linear two-terminal circuit or (equivalent) component for which the voltage at the terminals is at least partly dependent on a derivative of the current through the component/circuit.

Similarly, in the specific example, the capacitive impedance 503 corresponds directly to a capacitor but it will be appreciated that in other embodiments the capacitive impedance 503 may be any e.g. one port/two-terminal element which has an at least partial capacitive impedance, i.e. which has a capacitive reactance component, or in other words which has a complex impedance with a negative imaginary part. Thus, the capacitive impedance 503 may be a linear two-terminal circuit or (equivalent) component for which the current through the circuit/component at the terminals is at least partly dependent on a derivative of the voltage across the terminals.

It will be appreciated that in most embodiments, the resistive part of the inductive and capacitive impedances 501, 503 will typically be much smaller, and often negligible compared to the reactance component. This will ensure that the oscillations are relatively undamped, i.e. it will provide a relatively high Q for the resonance circuit.

For clarity and brevity, the following description will focus on the inductive impedance being an (ideal) inductor 501, and specifically the transmitter inductor 103 of FIGS. 1 and 2, and the capacitive impedance being an ideal capacitor 503. However, it will be appreciated that any reference to inductor 501 may as appropriate be replaced by a reference to an inductive impedance or reactance, and that any reference to capacitor 503 may as appropriate be replaced by a reference to a capacitive impedance or reactance. For brevity, the pair of the inductor 501 and the capacitor 503 will also be referred to as the resonating components.

The inductor 501 and capacitor 503 are coupled together in a resonant configuration. In the example, the inductor 501 and capacitor 503 are coupled in series resonance but it will be appreciated that in other embodiments they may be coupled in a parallel resonance configuration.

The inductor 501 and capacitor 503 will exhibit a natural resonance frequency corresponding to the resonance frequency of a resonance circuit comprising only the inductor 501 and the capacitor 503. As is well known, the resonance frequency for such a circuit is by $1/2\pi \sqrt{LC}$ where L is the inductance of the inductor 501 and C is the capacitance of the capacitor 503.

However, in the system of FIG. 5, the power transmitter further comprises a resonance modification circuit 505 which is arranged to control the resonance frequency for the transmitter resonance circuit by slowing a state change for the capacitor 503 and/or the inductor 501. The resonance modification circuit 505 can be considered part of the transmitter resonance circuit (or may be considered fully or partly external to this). It will also be appreciated that although the resonance modification circuit 505 is in FIG. 5 shown as single two terminal element coupled in series between the inductor 501 and the capacitor 503, this is merely an example and that other configurations will be used in other embodiments. For example, the resonance modification circuit 505 in the example of FIG. 5 has only two terminals but it will be appreciated that in other embodiments, the resonance modification circuit 505 may have more terminals and may be connected to other parts of the circuit, including e.g. to power supply rails for the driver 203.

The resonance modification circuit 505 is arranged to modify the resonance frequency by slowing a state change for one or both of the inductor 501 and the capacitor 503. The state of the inductor 501 and the capacitor 503 may be considered to be represented by the current energy values for the component, and specifically may be considered to correspond to the current of the inductor 501

$$\left(E = \frac{1}{2}LI^2\right)$$

and the voltage of the capacitor 503

$$\left(E = \frac{1}{2}CV^2\right).$$

In a conventional resonance circuit formed by a capacitor and inductor, the resonance is achieved by the continuous and periodic phase change that results from the energy flow back and forth between the capacitor (where energy is stored as electrical potential energy) and the inductor (where energy is stored as magnetic potential energy). The speed of state changes and the energy flow in such a system are given by the values of the capacitor and the inductor and this results in the oscillations at the natural resonance frequency of $$f_n = \frac{1}{2\pi\sqrt{LC}}.$$

However, in the system of FIG. 5, the resonance circuit is not allowed to simply perform a free running oscillation but rather the resonance modification circuit 505 slows down the state change for at least one of the inductor 501 and the capacitor 503 during a fractional time interval of some, and typically all of cycles.

The state change is thus slowed during the fractional time interval relative to the state change of a free running resonance circuit comprising only the capacitor 503 and the inductor 501.

Specifically, the state change is slowed by impeding the energy flow between the capacitor 503 and the inductor 501 (by slowing the energy flow from the inductor 501 to the capacitor 503, from the capacitor 503 to the inductor 501, or both from the inductor 501 to the capacitor 503 and from the capacitor 503 to the inductor 501). In a resonant circuit positive current flows from the inductor 501 to the capacitor 503 for half of a resonating cycle, and from the capacitor 503 to the inductor 501 for the other half of a resonating cycle. In many embodiments, the slowing of the energy flow may be achieved by impeding the current flowing between the resonating components. In many embodiments, the resonance modification circuit 505 may be arranged to impede current from the inductor 501 to the capacitor 503, e.g. by leading (some or all of the) current of the inductor 501 away from the capacitor 503 (including potentially leading both negative and positive currents away from the capacitor 503). In other embodiments, the resonance modification circuit 505 may be arranged to impede current from the capacitor 503 to the inductor 501, e.g. by disconnecting the capacitor 503 from the inductor 501 during the fractional time interval (thereby also setting the voltage across the inductor to zero, i.e. both the current and the voltage is set to zero for the inductor).

In these examples, the current flow between the resonating components is thus reduced or even prevented completely during the fractional time interval. During this fractional time interval, the state change of at least one of the components will be slowed or stopped completely. If this is performed during a number of cycles, and specifically in every cycle, the effect will be that the resonance circuit will behave as if resonating at a lower frequency than the natural resonance frequency for the free running resonance circuit configuration. This lower frequency will be referred to as the effective resonance frequency of the resonance circuit.

The resonance modification circuit 505 may in this way control and adjust the effective resonance frequency to be lower than the natural resonance frequency. The actual effective resonance frequency is in the system of FIG. 5 controlled by the resonance modification circuit 505 being capable of varying the timing/duration of the fractional time interval. Thus, the longer the fractional time interval is, the larger the effect of slowing the state change will be, and thus the lower will be the effective resonance frequency.

In the specific exemplary system of FIG. 5, the resonance modification circuit 505 is not merely independently controlled to provide a desired resonance frequency. Rather, the operation of the resonance modification circuit 505 is closely integrated with the driving of the resonance circuit 201 and thus with the power transfer and general operation of the power transfer system.

Specifically, in the system of FIG. 5, the driver 203 generates a timing signal and feeds this to the resonance modification circuit 505. The timing signal includes transitions that indicate when the fractional time interval should start, end, or both (there may be other transitions that are ignored). The resonance modification circuit 505 is arranged to align the fractional time intervals to these transitions. A transition is typically a change in a signal parameter, such as typically a change in a signal level. However, in some scenarios, a transition may be a change in another signal parameter, such as for example a change in a phase or frequency of a signal or a (partial) signal component of a signal.

Thus, the transitions of the timing signal controls the timing of the fractional time interval, and specifically controls a start time, an end time or both the start and end time. The resonance modification circuit 505 accordingly sets the start and/or end time of the fractional time interval from the timing signal. Typically, the timing signal is a switch signal which is used to control a switch of the resonance modification circuit 505 which can activate/deactivate the impeding of the energy flow, i.e. it can activate/deactivate the slowing of the state change. The timing signal may include transitions which can be detected by the resonance modification circuit 505 and used by this to directly or indirectly control a switch for switching in and out current impeding. The resonance modification circuit 505 typically aligns a start or end time with the transitions by switching the slowing in or out substantially at the same time as the corresponding transition (say within $\frac{1}{50}^{th}$ of a cycle time period).

Thus, in the system, the driver 203 controls at least part of the timing of the fractional time interval. Furthermore, the driver 203 is arranged to control the timing signal such that this, and accordingly the fractional time interval, is synchronized to the drive signal. Specifically, the driver comprises a synchronizer 507 which generates the timing signal and time synchronizes this to the drive signal.

Specifically, as will be described with specific examples later, the start and/or end time may be generated to have a fixed time offset to the time of an event within the individual cycles of the drive signal. The event may specifically be the drive signal crossing a signal level threshold (such as e.g. at a zero crossing), when an extreme occurs (a local or global (within the cycle) maximum or minimum), when a transition occurs (e.g. an edge of a square drive signal), or when a switch of a switch circuit (such as a switch bridge corresponding to the example of FIG. 3 or 4) switches. Thus, the start and/or stop time is controlled to have a fixed time offset relative to the time instant of such an event. Accordingly, if the timing of the event in a cycle changes (e.g. due to a change in the frequency/time period of the cycle of the drive signal), the controlled start and/or stop time will change accordingly.

In many embodiments, one of the start and stop times may be controlled to have a fixed time offset with respect to a switch time of a switch circuit generating the drive signal, whereas the other time is controlled to have a fixed time offset relative to a time instant of a signal of at least one of the capacitive impedance 503 and the inductive impedance 501 crossing a threshold.

For example, a diode and a switch may be coupled in series and used to direct current away from the capacitive impedance 503 (e.g. by short circuiting the capacitive impedance 503 or by short circuiting the connection between the capacitive impedance 503 and the inductive impedance 501 to a rail voltage (e.g. of zero)). In this arrangement, the switch may be open such that when the voltage over the capacitor (or of the connection point) crosses a threshold corresponding to the diode, this will begin to conduct. Thus, the start time is given by the signal crossing the threshold. However, the end time is determined to have a fixed time offset relative to a switch time for the switches of a full bridge generating the drive signal. Thus, this time is directly time linked to the generation of the drive signal. Accordingly, if the time period of the drive signal increases from one cycle to the next, the resonance modification circuit 505 may automatically adapt to this change—even within the same cycle.

Thus, in many embodiments, the timing of the fractional time interval is closely linked to the drive signal. This linkage provides a close correspondence between the driving of the resonance circuit 201 and the effective resonance of the resonance circuit 201. The linking of the driving signal and timing signal specifically allows the resonance frequency to automatically be locked to be the same frequency as the operating frequency of the drive signal. Indeed, the synchronizer 507 can synchronize the timing signal, and thus the fractional time interval, such that each cycle time of the resonance circuit 201 is the same as the cycle time for the corresponding cycle of the drive signal. Thus, the approach of controlling the fractional time interval by the driver and this being based on the drive signal can provide a system wherein the resonance frequency is always the same as the drive signal. Indeed, even the individual time periods of each individual cycle time can be controlled to be the same.

The approach not only allows for low complexity, and for example does not require any measurements or detections of any signals of the resonance circuit 201 (such as inductor or capacitor current or voltage), but it can also automatically guarantee that the frequencies are identical.

The approach may provide a number of advantages. In particular, it may reduce, and in many embodiments prevent, intermodulation. It may also in many embodiments provide improved power transfer, and specifically may improve power transfer efficiency. Typically, the power transfer efficiency is increased the closer the transmitter resonance frequency (the resonance frequency of the transmitter resonance circuit), the receiver resonance frequency (the resonance frequency of the receiver resonance circuit), and the operating frequency of the drive signal are to each other. The described approach allows the operating frequency and transmitter resonance frequency to be closely and automatically linked together while allowing them to be varied with respect to the receiver resonance frequency. Accordingly, only an adaptation of the drive signal may be applied with the transmitter resonance frequency automatically also being set.

Figure 6:
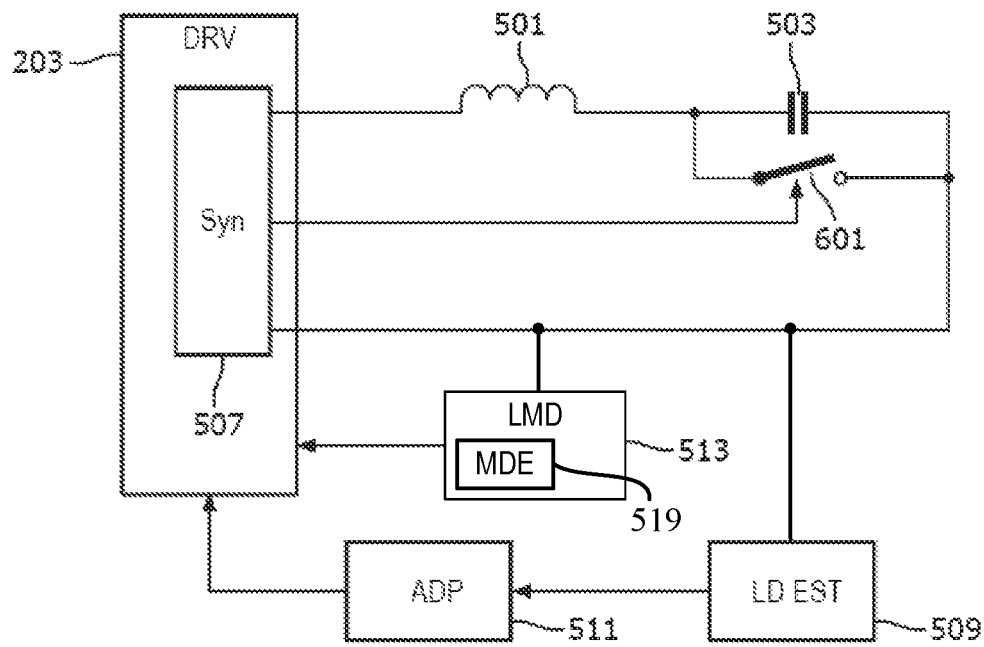
FIG. 6 illustrates an example of elements of a power transmitter in accordance with some embodiments of the invention.

FIG. 6 illustrates an example of the power transmitter of FIG. 5 wherein the resonance modification circuit 505 is arranged to slow the state change of the capacitor 503. In the example, the resonance modification circuit 505 is arranged to divert current from the inductor 501 away from the capacitor 503 during the fractional time interval. The diversion is achieved by a switch 601 which is coupled in parallel with the capacitor 503 and which is arranged to short-circuit this. Thus, the resonance modification circuit 505 may be implemented by a controllable switch.

In the example, the switch 601 is closed during the fractional time interval. The opening and the closing of the switch 601 is controlled by the transitions of the timing signal generated by the driver 203 and is accordingly synchronized to the switch signal. When the switch is closed, the current that is flowing through the inductor 501, and which would otherwise charge or discharge the capacitor 503, is instead diverted through the switch 601. Thus, by short circuiting the capacitor 503, the current bypasses the capacitor 503 and accordingly does not charge the capacitor. In the example, switch 601 is arranged to close at a time instant corresponding to the voltage across the capacitor 503 being zero. At this time, there is substantial current through the inductor 501 (indeed the current will be at the maximum level). However, by short-circuiting the switch, this current is no longer flowing through the capacitor 503 but will instead flow through the switch 601. Accordingly, the short circuit of the capacitor 503 ensures that the voltage is maintained at zero, i.e. the state of the capacitor 503 is kept constant.

It should be noted that the switch 601 accordingly forms a current diversion path which may divert both positive and negative current from the capacitor 503.

After a certain duration, i.e. at the end of the fractional time interval, the switch is opened again thereby resulting in the current flowing through the inductor now flowing into (or out of) the capacitor 503. As a result, the capacitor 503 starts charging and the capacitor voltage changes accordingly. This will result in the effective capacitance of the capacitor 503 as "seen" from the inductor being increased and thus in the resonance frequency being reduced. The resulting effective resonance frequency will depend on the timing of the fractional time interval with increasing duration resulting in reduced effective resonance frequency.

Specifically, by short circuiting the capacitor for part of the period of drive signal, the effective capacitance will be increased.

In order to illustrate this effect, a capacitor C1 may be considered which is charged with an average current $\overline{i(t)}$ for a time t2 to a voltage U1(t2). The voltage U1(t2) may be expressed as:

$$U1(t2) = \frac{1}{C1}\int_0^{t2} \overline{i(t)}dt \rightarrow U1(t2) = \frac{\overline{i(t)} * t2}{C1}.$$

Considering instead another capacitor C2 with a smaller value than C1 but being short circuited from 0 to t1 and charged in the time interval from t1 to t2, this capacitor is charged with the same average current $\overline{i(t)}$ to voltage U1(t2). For C2 the voltage can be determined as:

$$U2(t2) = \frac{1}{C2}\int_0^{t2}\overline{i(t)}dt = \frac{1}{C2}\int_0^{t1} 0 dt + \frac{1}{C2}\int_{t1}^{t2}\overline{i(t)}dt \rightarrow U2(t2) = \frac{\overline{i(t)} * (t2-t1)}{C2}$$

If U1(t2) and U2(t2) are equal at t2, then C1 can be expressed by:

$$C1 = \frac{t2}{t2-t1} * C2.$$

In other words, although capacitor C2 is smaller in value, at time t2 both capacitors are charged to the same voltage. At time t2, capacitor C2 exposes the inductor to the same voltage as capacitor C1. Thus, the effect of the short circuiting is to increase the effective (or apparent) capacitance of the capacitor as "seen" by the inductor.

Figure 7:
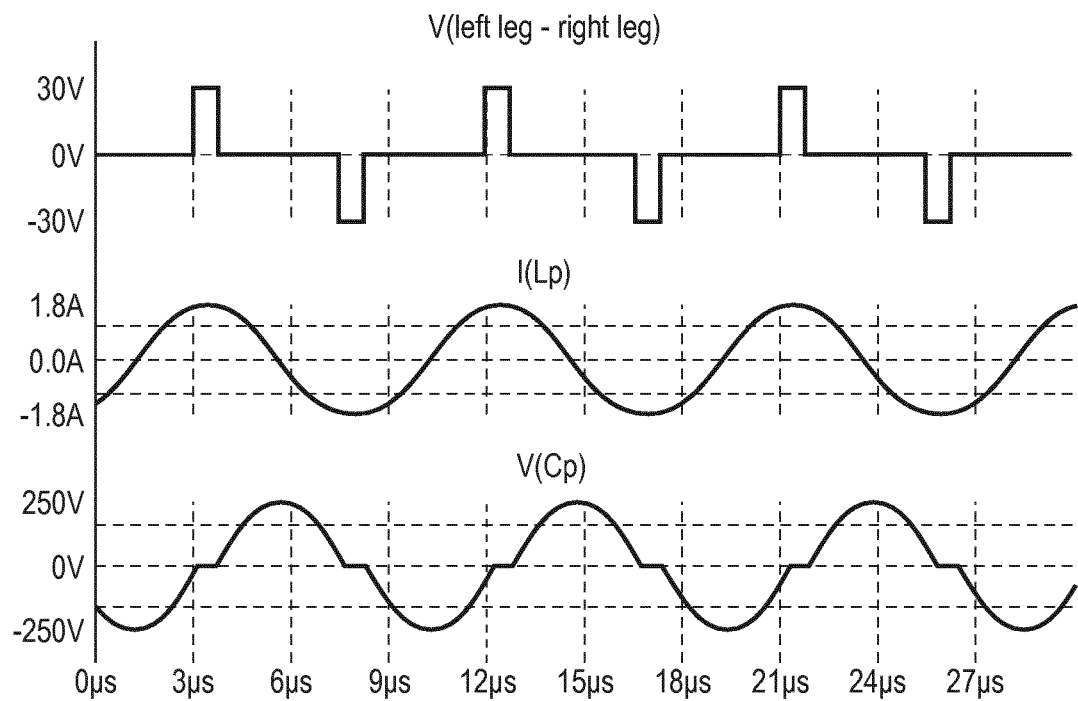
FIG. 7 illustrates examples of signals of a power transmitter in accordance with some embodiments of the invention.

An example of the signals in the circuit of FIG. 6 is provided in FIG. 7. In the example, the inductance of the inductor 501 is Lp=200 uH and that capacitance of the capacitor 503 is Cp=8.2 nF resulting in natural resonance frequency of:

$$fp = \frac{1}{2\pi * \sqrt{Lp * Cp}} = 125 \text{ kHz}.$$

In the example, the upper curve shows the drive signal.

As can be seen, for each cycle, the switch 601 is arranged to short circuit the capacitor 503 during a first fractional time interval (for a positive zero crossing of the capacitor voltage) and during a second fractional time interval (for a negative zero crossing of the capacitor voltage). In each fractional time interval, the voltage is thus kept constant for approximately 1 μs. During this time, the voltage of the capacitor 503 does not change. Similarly, the current through the inductor 501 hardly change either (it is almost constant at the maximum value) due to the inductor 501 not being exposed to a voltage.

As can be seen, the effective resonance frequency is lowered, and indeed in the example, an effective resonance frequency of around 102 kHz is achieved.

The exact effective resonance frequency can be set simply by adjusting the duration of the fractional time intervals. The longer the duration, the lower the frequency.

Further, it can be seen that if the duration between the drive signal pulses is kept constant, the operating frequency of the drive signal can be changed by the duration of the drive signals pulses changing. However, this will directly result in the right edge of the timing signal changing in the same way, and by keeping the left edge of the timing signal coupled to the zero crossing of the capacitor it results in the fractional time intervals changing correspondingly. Accordingly, the resonance frequency will directly follow the drive signal operating frequency and will inherently be the same.

Thus, the approach may effectively tie the drive frequency and the transmitter resonance frequency together such that these are effectively substantially identical.

Conventionally for loose coupling, power transfer is optimized for resonant operation and accordingly the transmitter resonance frequency and drive frequency are controlled to be identical to the receive frequency. If such a conventional approach were applied in the described system the drive circuit would control the drive frequency (and thus the transmitter resonance frequency) to be identical to the resonance frequency of the power receiver (the receiver resonance frequency). Accordingly, a conventional approach will result in the drive frequency being determined by the receiver resonance frequency.

However, in the system of FIGS. 5 (and 6) the drive frequency is allowed to vary and be different from the receiver resonance frequency. Thus, the drive frequency is not controlled or given by the receiver resonance frequency. Rather, in the described system, the drive frequency (and thus the transmitter resonance frequency) is adapted based on the equivalent load resistor representing the loading of the power transfer signal.

Specifically, the power transmitter 101 comprises a load estimator 509 which is arranged to generate a load estimate which is indicative of the power being extracted from the power transfer signal. The load estimator 509 may for example measure the current through and voltage over the transmitter resonance circuit 201 and from this determine the power being provided to the power transfer signal (and thus reflecting the power that is being extracted from this by (typically) the power receiver).

The load estimator 509 is coupled to a drive frequency adapter 511 which is fed the load estimate. The drive frequency adapter 511 is coupled to the driver and is arranged to control the drive frequency. For example, the drive signal may be generated from an internal variable oscillator of the driver 203 and the drive frequency adapter 511 may control the frequency of this oscillator by providing this with a control signal (which could be an analog or digital control signal depending on the specific implementation).

The approach may in particular improve load communication in many wireless power transfer systems. Indeed, the system of FIGS. 5 and 6 comprise a load modulation receiver 513 which is arranged to receive messages from the power receiver 103 where the messages are load modulated onto the power transfer system. In the example, the load modulation is performed at least partly by a varying reactive load, i.e. the load modulation includes a variation of at least one of an inductive and capacitive load (i.e. an imaginary load introducing a phase difference between the voltage and current over the load). In many embodiments, the load modulation may be performed by the power receiver switching in and out a capacitor over the power receive coil.

On the physical level, the communication channel from the power receiver 105 to the power transmitter 101 is implemented using the power transfer signal as a communication carrier. The power receiver 105 transmits data messages by modulating the load of the receiver coil 107. The power receiver 105 may for example do this by connecting and disconnecting a capacitor coupled in parallel to the receive coil 107 thereby changing the resonance, and thus load characteristics of the power receiver 105. These changes result in corresponding variations in the power transfer signal at the power transmitter side, and specifically in variation in the current and voltage of the transmitter inductor 103. These changes are directly or indirectly detected by the power transmitter 101 and used to demodulate the load modulation data from the power receiver 105.

Specifically, the load modulation may e.g. be detected by a change in the amplitude and/or phase of the drive signal current/voltage, by a change in the current/voltage of the transmitter inductor 103, and/or a change of current/voltage of a resonance circuit. As another example, the load modulation may be detected by a change in the current of the power supply to the driver 203 (specifically to the inverter/switch bridge).

The power receiver 105 can accordingly load modulate data onto the power transfer signal which the power transmitter 101 can then demodulate. The approach may for example correspond to that described for Qi in "System description, Wireless power Transfer, Volume I: Low Power, Part 1: Interface Definition, Version 1.0 July 2010, published by the Wireless power Consortium" available via http://www.wirelesspowerconsortium.com/downloads/wireless-power-specification-part-1.html, also called the Qi wireless power specification, in particular chapter 6: Communications Interface (or in subsequent versions of the Specification).

The load modulation is specifically used to adapt the power transfer, and in particular to implement a power control loop that continuously adapts the transmitted power level based on power control messages received from the power receiver 105. The power control messages are communicated by load modulation.

Thus, the load modulation results in variations in e.g. the transmitter inductor current and this may be measured and demodulated as will be known to the skilled person. Thus, in the example, power transmitter of claim 1 further comprises a receiver 513 for detecting messages load modulated onto the power transfer signal by a varying reactive load.

However, intermodulation distortion (resulting from differing drive frequencies and transmitter resonance frequencies) can degrade load modulation communication. Considering a high Q resonance circuit, if the driver 203 applies a signal at a frequency that is equal to the transmitter resonance frequency, the oscillations can be sustained for a very long time, even in the presence of damping. In this case, the very high currents may flow through the circuit. However, if the driver 203 applies a signal at a frequency that is different from the resonance frequency, the system will not resonate very well, resulting in much lower current flows. In fact, in the latter case, the current and voltage signals in the circuit will contain two frequencies, namely the driving frequency and the resonance frequency, where the resonance frequency will be more pronounced with a higher Q factor of the resonance circuit. The two frequencies in the current and voltage signals lead to a beat frequency, which is referred to as intermodulation. In a wireless power transfer system, which relies on amplitude modulation caused by load modulation, this can make reliable communications difficult, if not impossible.

However, this may be effectively mitigated by controlling and linking the resonance frequency of a power transmitter and the drive frequency of the drive signal. The specific approach may e.g. provide reduced intermodulation distortion by linking the drive signal and the resonance frequency via the synchronization/alignment of the fractional time intervals to the drive signal thereby allowing the operating frequency and the resonance frequency to be locked together.

However, it has been found that despite using such an approach, communication may in some scenarios be suboptimal, and indeed it has been found that unsatisfactory communication reliability may occur.

The inventors have not only realized this problem but further realized potential causes, and that the issue may be effectively mitigated in systems such as those of FIGS. 5 and 6 by adapting the drive frequency in dependence on the equivalent load resistor for the loading of the power transfer signal.

Specifically, the Inventors have realized that modulation depth (the difference between detected measurement values (of e.g. the transmit coil current or voltage) for different modulation symbols/data bits) may be impacted by the load of the power transfer signal, and indeed that the impact may be unexpected resulting in conflicting requirements/preferences of the drive frequency for different loads. In particular, the Inventors have realized that whereas sufficient modulation depth can often be achieved for a reasonable range of loads of the power transfer signal if a varying resistance is used for load modulation, this is often not the case for load modulation using a reactive load, such as load modulation using a variable capacitive load. This may be a significant problem in many scenarios as load modulation is often performed by the switching of a capacitor (e.g. this approach is used in Qi).

The Inventors have further realized that by employing an adaptive drive frequency (and transmitter resonance frequency) that is variable and which accordingly is not locked to the receiver resonance frequency, the issue may be mitigated without this causing unacceptable impact to e.g. the power transfer operation and efficient. Thus, the Inventors have realized that rather than applying a conventional approach of adapting the drive frequency and transmitter resonance frequency to be the same as the receiver resonance frequency, improved overall performance can be achieved by allowing the drive frequency and transmitter resonance frequency to be different than the receiver resonance frequency, and thus to be variable with respect to the receiver resonance frequency. This may allow improved communication performance which can be achieved without unacceptably degrading e.g. power transfer efficiency. They have further realized that by adapting the drive frequency (and thus the transmitter resonance frequency) in response to the equivalent load resistor of the power transfer signal, the communication performance may be improved substantially.

The Inventors have further realized that the issue may be critical for especially reactive (and specifically capacitive) load modulation where the variable load impedance is substantially imaginary (specifically the load impedance may be a capacitor which is switched in an out to indicate a binary value). Indeed, the Inventors have realized that the modulation depth may for such loads be substantially reduced at high power levels, and indeed may even be reduced to zero. The Inventors have further realized that this to an extent may (at least partly) be due to the way the resonance frequency of the transmitter resonance circuit is changed. Specifically, the modulation capacitor (or potentially a modulation inductor) in the power receiver shifts the resonance frequency of the receiver somewhat thereby causing modulation variation. However, the adaptation of the resonance frequency in accordance with the prior art will change the resonance frequency of the power transmitter thereby to some degree compensating the effect of the modulation change, i.e. it will compensate for the shift in the receiver resonance frequency due to modulation. The net effect depends on the specific conditions and have in particular been realized to be dependent on the resistive load of the power receiver.

Accordingly, in the system of FIGS. 5 and 6, the drive frequency adapter 511 has been arranged to adapt the drive frequency (and thus the transmitter resonance frequency) in response to a load estimate which reflects an equivalent load resistor for the transmitter inductor 103 where the equivalent load resistance reflects a loading of the power transfer signal.

During operation, the driver 203 drives the transmitter resonance circuit such that the transmitter inductor generates the power transfer signal. If no electromagnetic entities are in the vicinity of the power transmitter, and thus if the electromagnetic power transfer signal does not interact with any other entities, the transmitter inductor will effectively operate as an ideal inductor (apart from internal parasitic losses and effects). However, the interaction of the power transfer signal with other electromagnetic entities result in a loading of the power transfer signal.

In particular, the power receiver extracts power from the power transfer signal thereby providing a loading of the power transfer signal. The loading of the power transfer signal affects the current and voltage through the transmitter inductor 103 and thus provides an equivalent impedance for the transmitter inductor 103. As is known in the field, the result of the loading of the electromagnetic transmit power transfer signal is that the transmitter inductor 103 acts like a one-port comprising an inductor (corresponding to the unloaded transmitter inductor 103 (or more generally an impedance if parasitic components are considered)) and an equivalent load impedance (corresponding to the loading of the transmitter inductor 103). As is also well known in the art, the equivalent load impedance may comprise a reactive component and a resistive component. The reactive component corresponds to the component for which the voltage and current of the transmitter inductor 103 are not in phase, and the resistive component of the loading of the power transfer signal corresponds to the component for which the voltage and current of the transmitter inductor 103 are in phase. Thus, the equivalent load resistor may reflect the resistive or real power being extracted from the power transfer signal and the equivalent reactive load may reflect the reactive or imaginary power being extracted from the power transfer signal.

Figure 8:
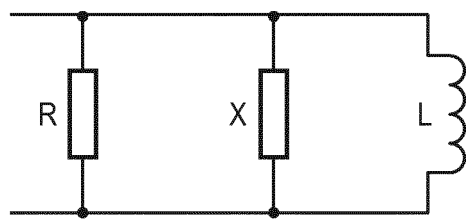
FIG. 8 illustrates an example of an equivalent diagram for an inductor of a power transmitter.

Thus, the transmitter inductor 103 may be represented by the equivalent circuit of FIG. 8 where the inductor L represents the unloaded transmitter inductor 103, the resistor R represents the equivalent load resistor of the power transfer signal, and the reactance X represents the equivalent reactive load.

In the systems of FIGS. 5 and 6, the load estimator is arranged to generate an estimate for this equivalent load resistor of the power transfer signal. This load estimate accordingly reflects the resistive component of the load of the transmitter inductor 103 resulting from power being extracted from the power transfer signal. The load estimate may often be an estimate of the resistive component of the loading by power receiver (when extracting power from the power transfer signal). The equivalent load resistor may specifically reflect the real (resistive) power being extracted from the power transfer signal. The equivalent load resistor may correspond to a load provided by a resistor of an equivalent circuit for the transmitter inductor 103 where the equivalent circuit comprises an inductor (or more generally an impedance) corresponding to the transmitter inductor 103 when the power transfer signal is unloaded (not electromagnetically interacting with any entities), a reactance reflecting/representing the reactive load resulting from the power transfer signal being loaded (i.e. electromagnetically interacting with other components), and the resistor reflecting/representing the reactive load resulting from the power transfer signal being loaded (i.e. electromagnetically interacting with other components).

The load estimate is thus indicative of the equivalent load resistor and does not just reflect an overall power being extracted or an overall current load for the power transfer signal. Rather, it specifically represents the resistive component of such loading, i.e. it represents the component of the load/extracted power for which the current and voltage of the transmitter inductor 103 are in phase. In other words, it represents the real part of the complex load impedance seen by the power transmitter. Further, the equivalent load resistor does not merely represent the power being extracted but represents the equivalent ohmic resistance of the load that is experienced by the power transmitter due to the loading of the power transfer signal. Specifically, the equivalent load resistor may be considered an equivalent resistor coupled in parallel to the transmitter inductor 103 to represent the (resistive, real) power being extracted from the power transfer signal.

In the example of FIG. 8, the equivalent load resistance is an equivalent parallel load resistance, i.e. the resistive load component is represented by an equivalent resistive component in parallel with the transmitter inductor 103.

For such an equivalent parallel load resistance, the higher the power load (i.e. a higher extracted real or resistive power), the lower the load value, i.e. the lower the Ohmic value of the equivalent parallel load resistance. Thus, in such embodiments, the value of the equivalent load resistance increases for decreasing power loads, and thus the power and resistance loads have a reciprocal relationship. The following description will focus on the equivalent load resistance being determined as an equivalent parallel load resistance. Thus, references to higher values of the equivalent load resistance represent higher values of the equivalent parallel load resistance and thus lower power loads. Similarly, references to lower values of the equivalent load resistance represent lower values of the equivalent parallel load resistance and thus higher power loads.

However, it will be appreciated that the equivalent load resistance could also be determined as an equivalent series load resistance, i.e. the equivalent load resistance could be considered a resistor in series with the transmitter inductor 103. For such an equivalent load resistance, a lower value (i.e. a lower Ohmic value) corresponds to a lower power load whereas a higher value (i.e. a higher Ohmic value) corresponds to a higher power load.

It will be appreciated that an equivalent parallel load resistance and an equivalent series load resistance are inherently equivalent and that an adaptor adapting the drive frequency based on the equivalent series load resistance inherently also corresponds to an adaptor adapting the drive frequency based on an equivalent parallel load resistance, and vice versa. Indeed, it will be appreciated that these have a reciprocal relationship with each other and that one can readily be calculated from the other. It will furthermore be appreciated that an adapter arranged to adapt a drive frequency in a certain way for increasing values of an equivalent parallel load resistance is equivalently an adapter that adapts the drive frequency in such a way for a corresponding decrease in values of an equivalent series load resistance (and vice versa).

It will be appreciated that the load estimator may use different approaches to determine the load estimate in different embodiments. For example, the load estimator may measure the transmitter inductor current amplitude, the transmitter inductor voltage amplitude, and the phase difference between these. It may then calculate the equivalent load resistor as the ratio between the voltage amplitude and the current amplitude once these have been compensated for the phase difference. Indeed, in some embodiments, the phase difference itself may be used to determine an estimate of the equivalent load resistance as the phase difference indicates how large a proportion of the load is resistive.

In other embodiments, the load estimator 509 may for example maintain a constant voltage at the input to the driver circuit (e.g. the bridges of FIGS. 3 and 4) and measure the current amplitude. The equivalent resistor value may then be determined as the supply voltage divided by the average current.

In the system, the determination of the load estimate and the adapting of the drive frequency is (at least partly) performed during the power transfer phase. It is performed during a phase wherein power is transferred from the power transmitter to the power receiver and thus during a phase wherein the power receiver is extracting power from the power transfer signal. The power extracted from the power transmitter typically varies depending on the specific operation of the power receiver, and in the described system, the load estimator is arranged to dynamically vary the load estimate to reflect the variations in the load of the power transfer signal by the power receiver. Similarly, the drive frequency adapter 511 is arranged to dynamically vary the drive frequency in response to such variations in the load estimate. Thus, during the power transfer phase, i.e. during a time when power is actually transferred to the power receiver, and e.g. power control and other functions usually applied during the power transfer is active, the power transmitter is arranged to dynamically vary the drive frequency to reflect the changes in the load. In this way, the system can effectively optimize operation and simultaneously provide both efficient communication performance and efficient power transfer.

In many embodiments, the drive frequency adapter 511 may specifically be arranged to bias the drive frequency towards the natural frequency (of the transmitter resonance circuit) for increasing power and/or it may be arranged to bias the drive frequency away from the natural frequency for decreasing power.

In some embodiments, the drive frequency adapter 511 is arranged to adapt the resonance frequency to be further away from a resonance frequency of the capacitive impedance and inductive impedance (i.e. the natural resonance frequency) for a load estimate indicative of a first equivalent load resistance than for a load estimate indicative of a second equivalent load resistance where the first equivalent load resistance is higher than the second equivalent load resistance (i.e. the second equivalent load resistance corresponds to a higher amount of power being extracted than the first equivalent load resistance for a constant voltage (or current)).

For example, in some embodiments the drive frequency adapter 511 may determine the drive frequency as a monotonically decreasing function of the equivalent load resistor estimate. The function may be dependent on other parameters, such as on a measured modulation depth. This modulation depth may be provided by a modulation depth estimator 519 in the receiver (load modulation decoder) 513.

This may result in the drive frequency being closer to the natural resonance frequency of the transmitter resonance circuit for lower equivalent load resistors (typically higher power) and further from the natural resonance frequency and closer to the receiver resonance frequency for higher equivalent load resistors (typically lower power). Such an approach may provide improved trade off by allowing efficient communication with sufficient modulation depth in all scenarios, yet reducing the power loss caused by the resonance modification circuit for higher power loads where this may be more significant.

Figure 9:
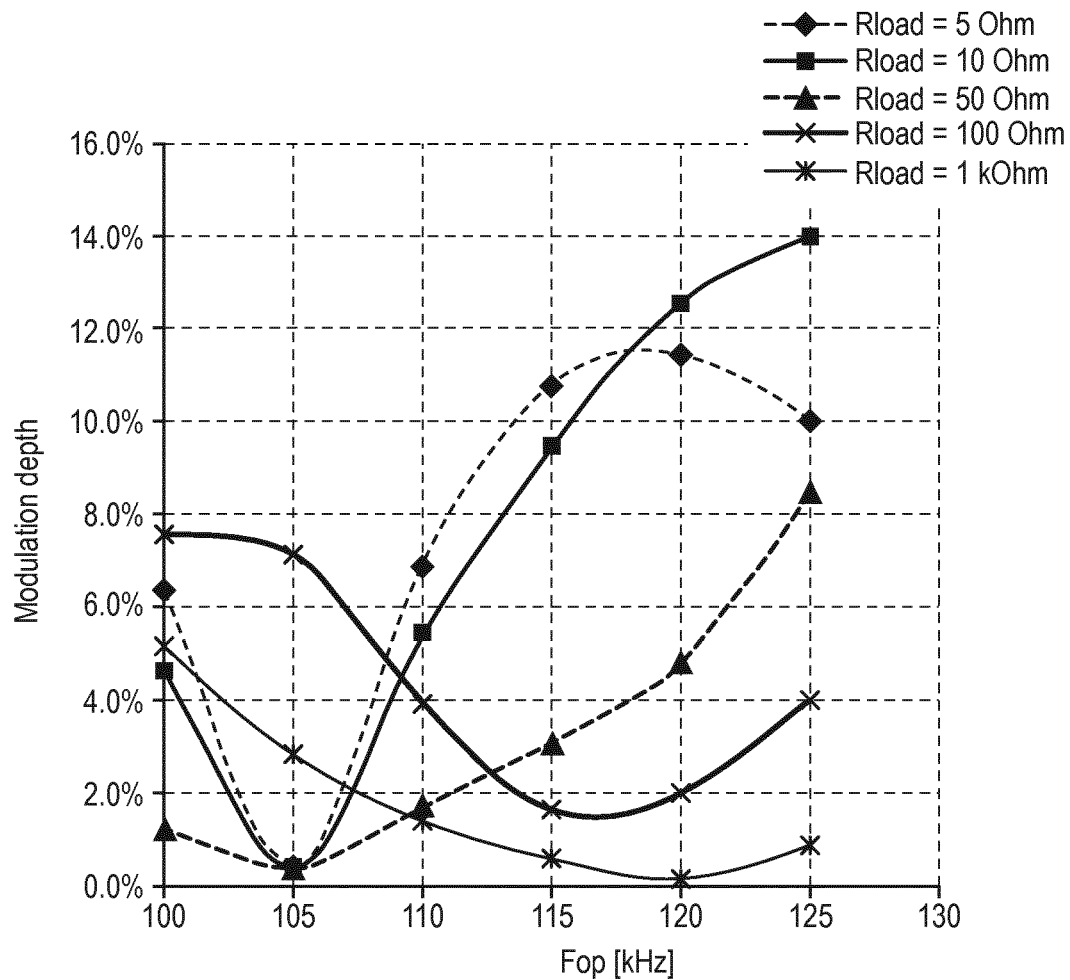
FIG. 9 illustrates examples of modulation depth as a function of resistive loads and a drive frequency of a power transmitter.

To further appreciate the approach, FIG. 9 may be considered. This shows the resulting modulation depth as a function of respectively the equivalent load resistor and the drive frequency for an exemplary system in accordance with the Qi specification. The results indicate the performance for a situation where a load resistor Rload is applied at the output of the power receiver with a constant voltage of 5V. The load resistor Rload is thus the load of the power receiver 105 and this will translate into an equivalent load resistor at the power transmitter side with the exact value of this load being dependent on the drive voltage etc. as will be known to the skilled person. In the example, the natural resonance frequency of the transmitter resonance circuit is 125 kHz and the receiver resonance frequency is 105 kHz. The coupling factor is 0.05.

As can be seen there is a strong dependency of the modulation depth on both the drive frequency (referred to as Fop) as well as on the load resistance Rload. This translates into a very strong dependence on the drive frequency and the equivalent load resistor. Indeed, as can be seen, for a low resistive load (high power extraction), the modulation depth is very low (and indeed may disappear) for drive frequencies that are low, and specifically which are close the receiver resonance frequency, whereas the modulation depth is high for high drive frequencies. In contrast, for high resistive loads (low power extraction), the modulation depth is very low (and indeed may disappear) for drive frequencies that are high, and specifically which are close the natural resonance frequency of the transmitter resonance circuit, whereas the modulation depth is higher for low drive frequencies.

This may be a particular problem for systems such as Qi where there is a high variation in load, and in particular where the load conditions may be very different in different phases of operation.

Indeed, when an appliance such as a smartphone is placed on the surface of a power transmitter, the load of power receiver is first not connected. More specifically, the load (e.g. the battery of a smartphone) is not connected during the ping and identification & configuration phases of the Qi Specification. The actual load of the receiver is thus typically in the range of 1-2 kΩ, which corresponds to the input impedance of the internal microcontroller of the receiver. As a second step, the load is connected during the power transfer phase (e.g. battery is connected). During this phase, the battery is charged via the inductive link. In this situation, the receiver has a low resistive load (i.e. large power extraction load) typically in the range of a few Ohms to a few tens of Ohms. Moreover, the load is typically not constant during the power transfer phase since the equivalent impedance of the battery depends on its charging status.

It has been identified that if the drive frequency is kept constant, the communication channel is typically not operational throughout all the power transfer phases (i.e. from the ping phase to the power transfer phase). In the system of FIGS. 5 and 6, this is addressed by adapting the drive frequency based on an estimate of the equivalent load resistor and it has been found that this typically allows high communication quality throughout all power transfer phases.

Figure 10:
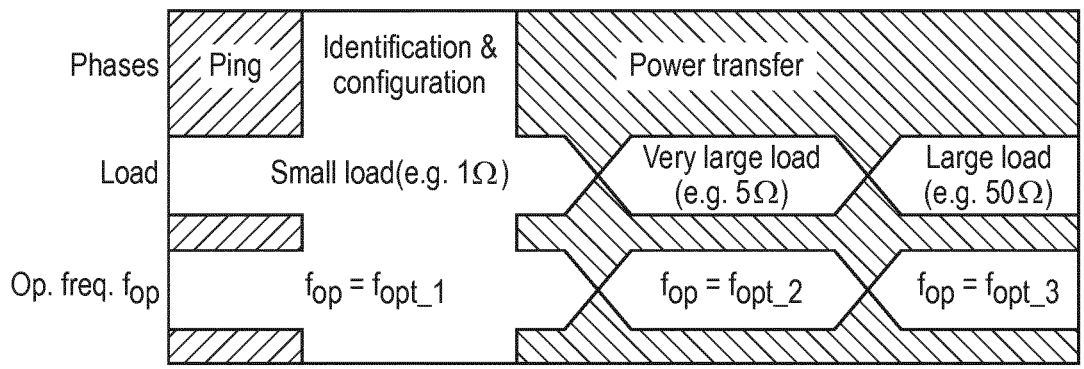
FIG. 10 illustrates examples of operating parameters during different phases of a power transfer system.

A conceptual schematic representing the different power transfer phases, an exemplary status of the load and a possible adjustment of the drive frequency is presented in FIG. 10. The power transmitter has a small power load (e.g. a high resistive load of, say, 1 kΩ) during the ping and identification & configuration phases. During this time period, the drive frequency is set to an optimal value $f_{opt\_1}$. The frequency is set such that a sufficient modulation depth is obtained. After that, at one instant in time during the power transfer phase (typically at the start of the phase), the power receiver connects its load (i.e. battery of a smartphone). Thus, the load of the power transmitter suddenly changes from a small power load (e.g. 1 kΩ) to a large power load (e.g. 5Ω). At this instant, the drive frequency is set to a new value $f_{opt\_2}$ in order to maintain a sufficient modulation depth. If the drive frequency is not adapted, the modulation depth can reach a value which is too small (potentially zero) for maintaining the communication link between the power receiver and the power transmitter. Finally, during the power transfer phase, the equivalent load impedance of the power transmitter can vary. For example, when the battery of the smartphone is almost charged, it does not draw as much current as when it is almost empty. In this situation, the power transmitter may again adapt the drive frequency to a new value $f_{opt\_3}$. The frequency adaptation can take place as many times as required.

Thus, as an example, the drive frequency may be adapted based on three different cases:

CASE #1—Small Power Load (i.e. High Resistive Load)

As previously explained, the power transmitter has a small power load (high resistive load, e.g. 1 kΩ) during the ping and identification & configuration phases. Based on the example of FIG. 9, the drive frequency may be set around 100 kHz. Typically, the frequency difference between the natural resonance frequency of the transmitter and the drive frequency should be approximately in the range of 20-30 kHz. This corresponds to a drive frequency around the resonance frequency of the power receiver (Frx). In the example of FIG. 9, this optimum frequency range is valid for load impedances larger than 100Ω.

CASE #2—Large Power Load (i.e. Low Resistive Load)

As previously explained, at the beginning of the power transfer phase, the power receiver connects its load. Typically, the equivalent impedance of the load can be as small as 5-10Ω. In the example of FIG. 9, the optimum drive frequency is in the range of 115-125 kHz. Thus, the frequency difference between the resonance frequency of the receiver and the drive frequency should be approximately in the range of 5-20 kHz. This corresponds to an operating frequency closer to the natural resonance frequency (Ftx) than to the receiver resonance frequency (Frx). In the example of FIG. 9, this frequency range may be valid for load impedances smaller than approximately 50Ω.

CASE #3—Intermediate Load

Finally, during the power transfer phase, the load is not necessarily always in the range of 5-10Ω. It may often also reach large values up to e.g. 50-100Ω. In the example of FIG. 9, for load impedances in this range, it is not clear what the optimal value for the drive frequency is. A transition between the two cases (i.e. small and large load cases described above) is expected to occur at an impedance in the range of 50-100Ω. The drive frequency may in this case be set to an intermediate value, say around 110-115 kHz, or better may be continuously be adapted (possibly based on other parameters such as the modulation depth).

Figure 11:
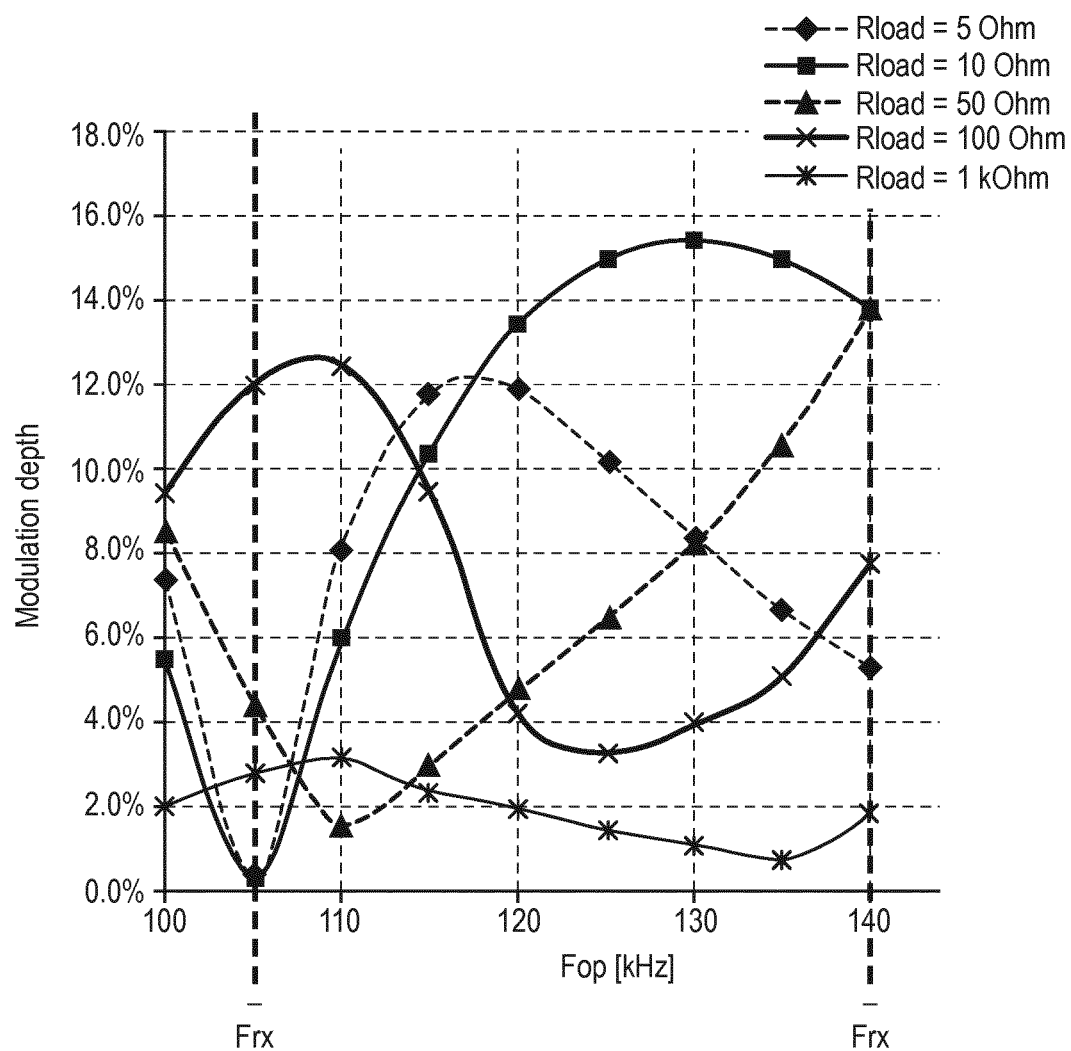
FIG. 11 illustrates examples of modulation depth as a function of resistive loads and a drive frequency of a power transmitter.

FIG. 11 illustrates an example corresponding to that of FIG. 10 but with the natural resonance frequency of the transmitter resonance circuit being increased to 140 kHz.

Considering this example, the drive frequency can for example first be set to 120 kHz ($f_{opt\_1}$=120 kHz). In this situation, a sufficient modulation depth of 2% is achieved at small power loads. After that, when the load is connected to the receiver, the modulation depth automatically increases to a large value. The drive frequency does not need to be changed instantaneously as the modulation depth is already high. However, it may be desirable to increase the drive frequency to be closer to the natural frequency as this reduces power loss in the modified resonance frequency. However, this does not need to be achieved quickly.

Thus in many embodiments, the drive frequency adapter 511 may be arranged to adapt the drive frequency such that the drive frequency is further from the natural frequency (the frequency given by the inductive and capacitive impedance) for an equivalent load resistor corresponding to a higher resistance (lower power load) than for an equivalent load resistor corresponding to a lower resistance (higher power load). Thus, for at least two values of the equivalent load resistor indicative of a respectively higher resistance and lower resistance, the drive frequency adapter 511 will control the drive frequency such that it is closer to the natural frequency of the transmitter resonance circuit for the lower resistance than it is for the higher resistance.

In some embodiments, a simple approach may be used, such as for example setting the drive frequency to a first value if the equivalent load resistor is above a given threshold and a second value if it is below. E.g., for the example of FIG. 9, the drive frequency adapter 511 may set the drive frequency to 105 kHz if the equivalent load resistor is above a threshold corresponding to an Rload of 75 Ohm, and to 120 kHz if it is below this value.

In other embodiments, more complex approaches may be used, for example the drive frequency may be set as a monotonically decreasing function of the equivalent load resistor.

Figure 12:
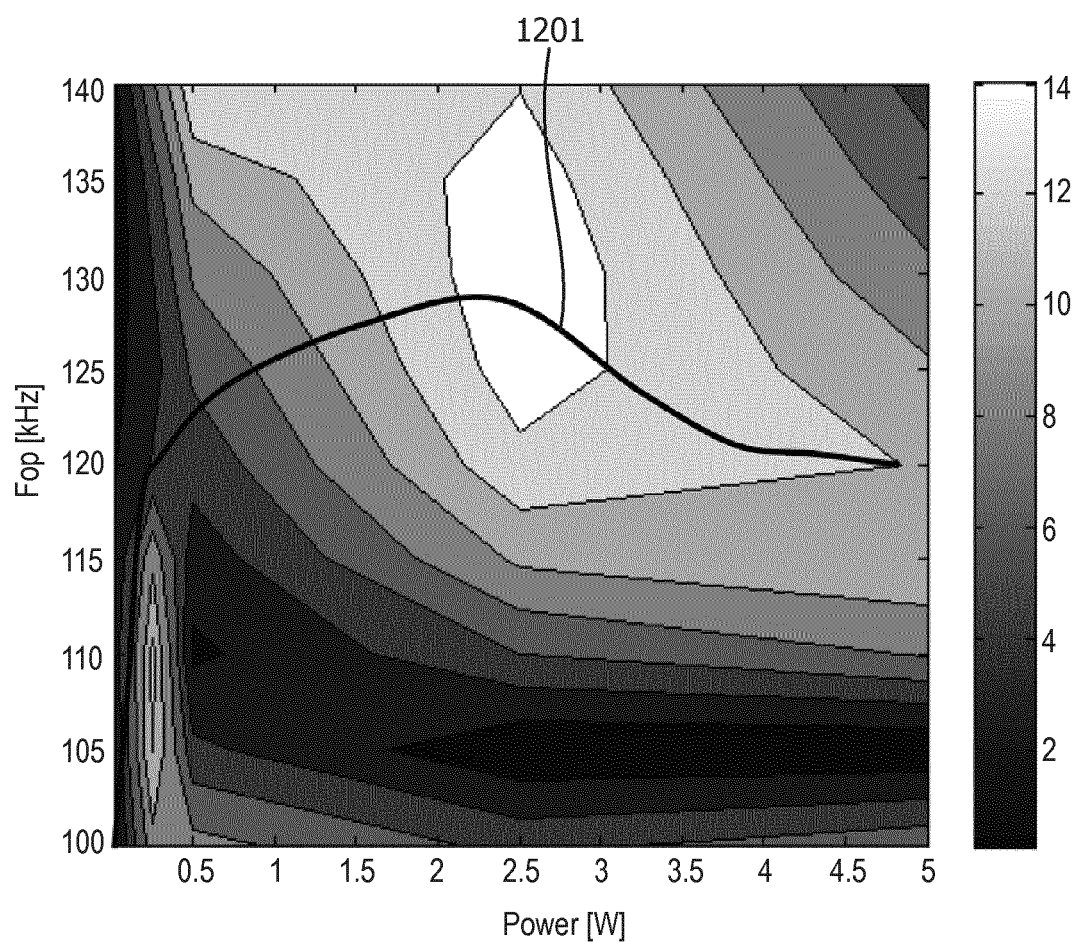
FIG. 12 illustrates examples of modulation depth as a function of resistive loads and a drive frequency of a power transmitter.

For example, FIG. 12 illustrates an example of the modulation depth (indicated by the lightness/darkness) as a function of the drive frequency (Fop) and the equivalent load resistor. In the example, the equivalent load resistor is given as a power value. Specifically, in the example, the voltage across the load resistor (and the transmitter inductor 103) is maintained constant and the equivalent load resistor accordingly correlate direction to the extracted power from the power transfer signal. Thus, in the example, the extracted power estimate is inversely proportional to the equivalent load resistor, e.g. a low power value corresponds to a high resistance and a high power value corresponds to a low resistance.

As can be seen, very high modulation depths (light areas) can be achieved for some combinations of load and frequency but at the same time unacceptable modulation depths (say below 2-4%) also occur for some combinations. Further, as can be seen, it is not possible to select a single drive frequency that will result in acceptable modulation depth for all loads.

However, as an example, the function represented by line 1201 may be employed by the drive frequency adapter 511 to determine the drive frequency from the estimated power extraction which in the specific example can be used as an estimate of the equivalent load resistor.

For example, for an extracted power estimate of 0.25 W, the drive frequency may be set to 110 kHz, for 0.5 W it may be set to 120 kHz, for 2 W it may be set to 127 kHz, for 4 W it may be set to 121 kHz etc.

By applying such a function, the drive frequency adapter 511 may set the drive frequency (and the transmitter resonance frequency) such that a modulation depth is achieved for all loads.

In most embodiments, the setting of the drive frequency may further be in response to other parameters than just the equivalent load resistor. Specifically, in many embodiments, the determination of the drive frequency may further be in response to second parameter being at least one of a modulation depth, a power loss (specifically of the resonance modification circuit), the receiver resonance frequency, the natural resonance frequency, the operational phase, the power transfer efficiency etc.

Indeed, in some embodiments, the drive frequency adapter 511 may be arranged to determine an operating range for the drive frequency in response to the load estimate and to restrict the drive frequency to that operating range. Thus, in such embodiments, the drive frequency is not given by the equivalent load resistor but rather an acceptable operating interval is determined based on this. Within that acceptable operating range, the drive frequency may then be determined based on other considerations, such as e.g. a desire to vary the frequency as little as possible.

E.g., for the example of FIG. 12, the power transmitter may be arranged to ensure that the modulation depth is at least, say, 4% as this will typically provide a highly accurate communication. Thus, for an extracted power of 0.25 W the acceptable operating range for the drive frequency may be from 100 kHz to 118 kHz, for an extracted power of 1 W the acceptable operating range for the drive frequency may be from 117 kHz to 140 kHz, for an extracted power of 4 W the acceptable operating range for the drive frequency may be from 108 kHz to 140 kHz, etc.

The drive frequency adapter 511 may specifically be arranged to perform a quick adaptation to ensure that the modulation depth is sufficiently large to support reliable communication based on load modulation. Thus, the approach may ensure that for a quick load change, the system can respond rapidly to change the drive frequency to a value which may perhaps not be optimal but which is ensured to be sufficient to allow communication. For example, when the system enters the power transfer phase and the power receiver switches in the external load, the power transmitter may quickly change the frequency to a value within the operating range corresponding to the new equivalent load resistor, thereby ensuring that communication is possible.

In many embodiments, the drive frequency adapter 511 may be arranged to adapt the drive frequency within the operating range in response to an operating parameter other than the load estimate. This operating parameter may specifically be a modulation depth measure or estimate, and/or a power loss estimate (e.g. for the resonance circuit).

For example, the power load estimator may continuously determine the current equivalent load resistor and may continuously determine an acceptable operating range for the drive frequency (and transmitter resonance). However, in addition the drive frequency adapter 511 may continuously adapt the drive frequency such that the modulation depth is maximized but under the constraint of the drive frequency remains within the allowable operating range.

As another example, the drive frequency adapter 511 may be arranged to continuously seek to reduce the power loss of the driver circuit and specifically of the resonance modifying functionality as this tends to be relatively power consuming. For example, in the example where the capacitor of the resonance circuit is short circuited for part of the cycle, a not insignificant amount of current is shunted past the resonating components thereby resulting in increased power loss. Further, the power loss may depend on the actual effective resonance frequency and specifically how far this differs from the natural resonance frequency. Indeed, the closer the effective resonance frequency is to the natural resonance frequency, the less the short-circuit of the capacitor is active, and thus the less current is shunted past the capacitor. Therefore, the drive frequency adapter 511 may seek to reduce the power loss by seeking to set the drive frequency as close to the natural resonance frequency as possible while still ensuring reliable communication, i.e. while still maintaining the drive frequency within the acceptable operating range.

In many embodiments, the drive frequency adapter 511 may operate a feed-forward adaptation of the drive frequency in response to the equivalent load resistor. In such a feed-forward control arrangement (also known as open-loop), the drive frequency (or acceptable/allowable range of drive frequencies) may be determined directly from the equivalent load resistor without any feedback loop being generated, and without any error signal being generated, or parameter being minimized. For example, when the equivalent load resistor is determined, the drive frequency adapter 511 may directly generate the allowable operating range as a function of the equivalent load resistor.

In addition, the drive frequency adapter 511 may also operate a control loop adaptation of the drive frequency which is based on another operating parameter than the load estimate. For example, the drive frequency adapter 511 may be arranged to operate a control loop that maximizes the modulation depth or minimizes the power loss. Such a control loop adaptation (also known as feedback control or closed loop control) may typically provide very accurate and reliable optimization and thus may ensure improved operation.

The combination of a feedforward approach for the drive frequency based on the equivalent load resistor, and a feedback or closed loop control of the drive frequency based on another parameter, such as the modulation depth, may provide particularly advantageous operation in many embodiments. In particular, the approach may provide a reliable but relatively slow adaptation or optimization that can fine tune operation (e.g, by optimizing the modulation depth) while still providing for the system to be able to react very quickly to sudden load changes. Thus may ensure that the communication can be assumed to be reliable even when such sudden load changes occur, and thus drop-outs in communication performance as a result of load changes can be effectively mitigated or even eliminated in many embodiments.

As an example, during the power transfer, the power receiver may extract, say 3 W from the power transfer signal. The feedforward control functionality has determined the corresponding equivalent load resistor and thus determined an allowable operating range from 108 kHz to 140 kHz. Within this range, the drive frequency adapter 511 may continuously determine the modulation depth and operate a control loop to maximize this value. If the power receiver now suddenly changes the loading of the power transfer signal to, say, 0.25 W, with the drive frequency being at, say, 125 kHz, the control loop operating on its own would only very slowly adapt the drive frequency. Indeed, initially, a modulation depth approaching zero would be experienced and this could make communication impossible. However, in the described example, the drive frequency adapter 511 may detect the change in load and immediately determine the new acceptable operating range from 100-117 kHz. As the current drive frequency set by the loop is outside this range, the drive frequency adapter 511 can instantly change the drive frequency to a value within the range, such as e.g. to the midpoint of the new allowable range, i.e. to around 104 kHz. The slow control loop may then proceed from this operating point and may maximize the modulation depth within this new range. The approach may thus provide a very efficient operation.

As mentioned, in many embodiments, the drive frequency adapter 511 may be arranged to adapt the drive frequency in response to other parameters than just the equivalent load resistance, i.e. the determination and setting of the drive frequency (and the transmitter resonance frequency) is based on both the equivalent load resistance and one and more other parameters. As described, the adaptation may for example be by employing a feedforward setting of an acceptable range and a control loop may then be implemented to optimize the drive frequency in response to other parameters. In other embodiments, the drive frequency adapter 511 may implement a complex algorithm or function simultaneously considering a range of parameters (including the equivalent load resistance) when determining the drive frequency.

In many embodiments, the drive frequency adapter 511 may specifically be arranged to adapt the drive frequency in response to a power loss of the resonance circuit. Specifically, when determining the drive frequency, the drive frequency adapter 511 may consider the power loss that occurs in the resonance circuit due to the state change being slowed.

In many embodiments, the power loss resulting from modifying the resonance frequency may be significant at particularly high power loads. For example, in the example where the resonating capacitor is "short" circuited for part of the cycle by a circuit with some losses, the energy lost in the short circuit will no longer be retained in the resonating circuit. The closer the effective resonance frequency is to the natural resonance frequency, the less the requirement for slowing the phase change, and thus the less the associated power loss. For example, the closer the effective resonance frequency is to the natural resonance frequency, the less the short circuiting of the capacitor, and thus the less shunted current and lost energy.

In many embodiments, the drive frequency adapter 511 may therefore seek to bias the drive frequency towards the natural frequency. For example, the drive frequency adapter 511 may seek to set the drive frequency to the highest value possible subject to the requirement that this should still provide an acceptable modulation depth for the given equivalent load resistance. For example, the drive frequency adapter 511 may be arranged to set the drive frequency to the highest value within the allowable operating range determined in response to the equivalent load resistance.

Specifically, rather than just adapt the drive frequency based on e.g. an overall efficiency of the power transfer (which may be difficult to determine due to complexity as the system efficiency depends on multiple parameters, namely the loss in the different parts of the system), the adapter may be arranged to specifically estimate power loss in the resonance circuit caused by the resonance frequency modification (by the resonance modification circuit 505).

If the loss resulting from resonance modification (the resonance modification loss, e.g. caused by the capacitor being short circuited) is too high, it might result in too much power being dissipated in the power transmitter output circuit, and therefore may result in an unacceptable temperature increase. To prevent any damage in e.g. the resonance modification circuit 505 due to heating caused by power dissipation, the drive frequency can be adapted towards the natural resonance frequency of the transmitter if the resonance modification loss becomes too high. For example, if the current in the transmitter inductor 103 increases to values that are considered problematic, the adaptor may decide to reduce the on-time of the capacitor short-circuiting by increasing the drive frequency towards the natural resonance frequency.

In some embodiments, the drive frequency adapter 511 may specifically be arranged to determine the drive frequency in response to the modulation depth for the load modulation. Thus, in some embodiments, the power transmitter may be arranged to determine the modulation depth. This may for example be measured as part of the demodulation process by measuring the difference in the amplitude of e.g. the current through the transmitter inductor 103 for different symbol values being demodulated. For example, for binary communication, the power transmitter may determine moving averages for the inductor current values for two different modulation loads (e.g. corresponding to different symbols or different values/levels within a symbol). For example, for Qi, a binary data value "1" is communicated as two level transitions and a "0" is communicated as one level transition in 0.5 ms. Moving averages may be determined for the different levels and the modulation depth may then be determined as the difference between these two values.

The drive frequency adapter 511 may, for example when detecting a change in the equivalent load resistance, set the drive frequency to a suitable value which is known to provide acceptable modulation depth operation. Following this step change in drive frequency, the drive frequency adapter 511 may then proceed to adapt the drive frequency based on the measured modulation depth, and specifically may seek to increase this. For example, it may change the drive frequency slightly and measure if this increases or decreases the modulation depth. If it increases, the drive frequency may be maintained at this value and otherwise it may be returned to the previous value. The process may then be repeated with the drive frequency being shifted on both directions. This may result in the modulation depth and thus the communication performance being optimized but it inherently tends to be a slow process. However, the combination with the adaptation based on the equivalent load resistance may ensure that the system can react quickly to e.g. step changes in the load of the power transfer signal by the power receiver.

Other parameters that may be considered when determining the drive frequency may include the coupling between the receiver and transmitter inductors, the power transfer efficiency and/or the operational phase.

The power transfer efficiency may for example be determined by the power receiver reporting the power it has extracted from the power transfer signal and the power transmitter comparing this to a locally generated estimate of the provided power, such as e.g. the power provided to the drive circuit (e.g. to the switch bridge). For example, the reported received power may be compared to the driver power given as the fixed supply voltage to the switch bridge multiplied by the average current provided to the switch bridge. In such an embodiment, the drive frequency adapter 511 may for example be arranged to sacrifice modulation depth for improved power efficiency when this is lower than a given threshold. Thus, in some embodiments, the drive frequency adapter 511 may e.g. be arranged to reduce the drive frequency for a given load to be closer to the receiver resonance frequency when the efficiency is below a threshold than when it is above the threshold.

In some embodiments, the drive frequency adapter 511 may be arranged to adapt the algorithm, or indeed use different functions and decision criteria, depending on which phase the system is operating in. For example, the drive frequency adapter 511 may use a different approach for the ping phase than for the power transfer phase. For example, when in the ping phase, the drive frequency adapter 511 may restricted to be in the interval of 100 kHz . . . 118 kHz whereas when it is in the power transfer phase it may instead be restricted to be in the interval of 108 kHz . . . 140 kHz.

In contrast to conventional approaches where the systems seeks to set the drive frequency and transmitter resonance frequency to be equal to the receiver resonance frequency. The described approach aligns the drive frequency and the transmitter resonance frequency but these are allowed to vary with respect to the receiver frequency.

However, in some embodiments, the drive frequency adapter 511 may also consider the receiver resonance frequency when determining the drive frequency. The receiver resonance frequency may for example be determined by the power transmitter by performing a frequency sweep during an initialization phase and measuring the effective impedance of the transmitter resonance frequency. In other embodiments, the power receiver may for example be arranged to transmit data to the power transmitter indicating the receiver resonance frequency.

Indeed, the power transfer operation may typically be more effective when the drive frequency, transmitter resonance frequency, and the receiver resonance frequency are the same. Whereas the Inventors have realized that it may typically be beneficial not to set the drive frequency to optimize this efficiency, it may still in many embodiments be desirable to consider the efficiency, and thus the receiver resonance frequency. For example, in some embodiments, the drive frequency adapter 511 may be arranged to adapt the drive frequency and the transmitter resonance frequency to be as close to the receiver resonance frequency as possible while constraining the drive frequency to be within the allowable operating range determined in response to the equivalent load resistance.

It will be appreciated that whereas the exemplary parameters have been considered individually above, the drive frequency adapter 511 may in many embodiments consider several of these. For example, the drive frequency adapter 511 may operate an algorithm which sets the drive frequency to provide a preferred trade-off between the different considerations for the given operating point as indicated by a plurality of parameters. E.g., the drive frequency adapter 511 may be able to determine a drive frequency by a table look up based on e.g. both equivalent load resistance, receiver resonance frequency, modulation depth and natural resonance frequency of the resonance circuit. The table may be populated by values determined by tests during the design or manufacturing phase.

In the system, the performance and trade-offs, in particular between the power transfer and communication performance, are managed by the adaptation of the drive frequency. In addition, by selecting suitable values for the operating range of the drive frequency, the natural resonance frequency given by the capacitive and inductive resonance impedances, and the range of the effective frequency that can be achieved by the resonance modification circuit 505, a highly efficient approach can be achieved which results in both reliable communication and efficient power transfer. Further, the approach may be made backwards compatible, e.g. it may be introduced to Qi power transmitters and power transfer systems.

In many embodiments, and specifically embodiments suitable for power transfer systems following the Qi specifications, the exact transmitter resonance frequency may not be known but it will be known that it falls within a predetermined range. Specifically, for Qi, it is specified that the receiver resonance frequency should fall within the range of 95 to 115 kHz. Thus, the power transmitter may not know exactly what the frequency of the power receiver is but may know that it is below a maximum frequency (of 115 kHz in the specific example). In many embodiments, the drive frequency may be constrained based on the receiver resonance frequency. For example, the receiver resonance frequency may be specified to be less than 115 kHz or e.g. 120 kHz and accordingly the power transmitter may be designed with this in mind. Thus, in many embodiments, the power transmitter may be aware of a maximum allowable resonance frequency for the power receiver.

In such embodiments, the power transmitter may be designed such that the natural frequency of the transmitter resonance circuit is higher than the maximum allowable resonance frequency. As the slowing of the state change reduces the effective resonance frequency this may allow the full range of the power receiver to be covered.

Further, in many embodiments, the resonance circuit of the power transmitter is designed such that the natural frequency exceeds the power receiver by no less than 20 kHz. Thus, the system has been designed to have a relatively high natural frequency which exceeds the resonance frequency of the power receiver by a substantial margin. This further allows the drive frequency to be variable within a range which may substantially exceed the range of power receiver resonance frequencies that may occur. It may further provide for improved communication and specifically acceptable modulation depths for a large range of loads.

The drive frequency is controlled to be further from the receiver resonance frequency for higher power loads (lower equivalent parallel load resistances) than for lower power loads (higher equivalent parallel load resistances). This may indeed be very desirable as it may allow the drive frequency to be moved closer to the natural resonance frequency and thus may reduce power loss in the transmitter resonance frequency modification circuit.

Indeed, in many embodiments, the drive frequency adapter 511 is arranged to adapt the drive frequency to be further away from the receiver resonance frequency for a first equivalent parallel load resistance than for a second equivalent parallel load resistance where the first equivalent parallel load resistance is lower than the second equivalent parallel load resistance.

For example, in scenarios where the drive frequency is arranged to be in an interval which is (known to be) higher than the receiver resonance frequency, the drive frequency adapter 511 may determine the drive frequency as a monotonically decreasing function of the equivalent parallel load resistance. Thus, higher drive frequencies may be employed when the equivalent parallel load resistance decreases (i.e. when higher power loads are experienced). As the receiver resonance frequency is lower than the drive frequency, this results in a bias away from the receiver resonance frequency for decreasing equivalent parallel load resistances (i.e. for increasing power loads).

In the described approach, the drive frequency adapter 511 may thus be arranged to de-tune the drive frequency (and the power transmitter resonance circuit resonance frequency) from the resonance frequency of the power receiver. The drive frequency adapter 511 may be arranged to introduce a difference between the drive frequency and the power receiver resonance frequency such that these deviate from each other. Further, the deviation may be increased for higher power loads, i.e. lower equivalent parallel load resistances.

This is counterintuitive as the detuning may reduce the efficiency and thus the approach may correspond to reducing the power transfer efficiency for increasing power levels. However, this reduction in efficiency, even when efficiency is most beneficial, may allow substantial improvement in communication performance and may specifically prevent that demodulation depth is reduced to a level where demodulation cannot be maintained at a sufficiently reliable level.

In particular, the approach may reflect the realization that at high loads, the close coupling of the drive frequency, transmitter resonance frequency, and receiver resonance frequency may result in the demodulation depth reducing to a level where load modulation cannot be accurately detected. However, by detuning the power transmitter side with respect to the power receiver side, the demodulation depth may be increased to allow efficient communication. Thus, the efficiency may be sacrificed in order to ensure reliable communication.

However, for low power loads (high equivalent parallel load resistance), the demodulation performance may be acceptable even with the close alignment of the power transmitter side frequencies and the power receiver resonance frequency. Therefore, it is acceptable to implement such an alignment to increase efficiency.

The drive frequency adapter 511 may accordingly determine, or receive, a load estimate which is indicative of the equivalent parallel load resistance. For example, an indication of the power extracted from the power transfer signal may be determined (e.g. by measuring the current or power provided to the power transmitter resonance circuit). The drive frequency adapter 511 may then determine the drive frequency such that it differs from the power receiver receiver frequency by a value that increases for increasing power loads. The drive frequency adapter 511 may e.g. calculate the deviation explicitly or this may be implicit as part of setting the driver frequency directly as a function of the power estimate.

It will be appreciated that many different approaches may be used for the power transmitter to consider or determine the power receiver resonance frequency. For example, in some embodiments, it may simply be a predetermined value or range of values which may implicitly or explicitly be included in the function for calculating the drive frequency.

For example, in some systems, power receivers may be required to have a resonance frequency which is in the range from, say, 100 kHz to 105 kHz. In such a case, the drive frequency may e.g. be controlled to be within a range from 105 kHz to 120 kHz with the frequency being increased for increasing power loads (decreasing equivalent parallel load resistance).

In other embodiments, the power transmitter may actively measure or estimate the power resonance frequency. For example, the power output may be determined as a function of frequency by the drive frequency being swept across a suitable range. The resonance frequency may then be determined to correspond to the most efficient power transfer.

In yet other embodiments, the power receiver may transmit information about its resonance frequency to the power transmitter which may then use the received value in determining the drive frequency adapter.

In contrast to a conventional approach where the power transmitter seeks to set the frequencies to match the power receiver resonance frequency, the current approach may vary the drive frequency to set this to differ relatively substantially from the receiver resonance frequency.

However, as the power loss may increase for increasing differences between the effective resonance frequency and the natural resonance frequency, it may be desirable not to have too large a natural resonance frequency. It has been found that in many embodiments and scenarios, particularly advantageous performance is found for the natural frequency not exceeding 160 kHz.

Thus, in many embodiments and scenarios, and in particular scenarios that are compatible with Qi approaches, the following values provide particularly advantageous operation with both effective power transfer and reliable communication performance:

A receiver resonance frequency in the range of: 95 kHz to 115 kHz.

A natural frequency of the transmitter resonance circuit in the range of: 115 kHz to 160 kHz.

A drive frequency and effective resonance frequency of the transmitter resonance circuit being variable in a range that does not exceed the range of: 115 kHz to the natural resonance frequency.

In some embodiments, the power transmitter may be arranged to determine the drive frequency based on messages received from the power receiver (typically by load modulation). Specifically, in some embodiments, the power transmitter may comprise a receiver which receives messages from the power receiver which comprise load indications that are indicative of a resistive loading of the power transfer signal by the power receiver.

For example, the power receiver may transmit messages which directly indicates the real power being consumed by an external load, such as e.g. the load consumed by a battery being charged. In other examples, the power receiver may e.g. be arranged to determine a resistance from a measurement of the current of the load and the voltage over the load.

The power transmitter may in such embodiments be arranged to adapt the drive frequency in response to the received load indications, and in particular it may be arranged to generate an estimate of the equivalent load resistance based on the received values. Indeed, in some scenarios, the equivalent load resistance can directly be determined from the reported load of the power receiver. For example, if the extracted power is known and the voltage provided to the switch bridge of the power transmitter is also known, the equivalent load resistance can be determined from the voltage divided by the averaged current provided to the driver circuit by assuming that the extracted power corresponds to the power provided to the drive circuit (e.g. with a compensation for estimated losses).

As a specific example of such an embodiment, the voltage provided to the switch bridge can be kept at a constant value. In that case, the averaged current provided is an inversely proportional indication of the load resistance. If the averaged current is high, the power extraction is high and the load resistance is low. If the averaged current is low, the power extraction is low and the load resistance is high.

The approach may in many scenarios provide improved performance and in particular may reflect that a more accurate estimate of the equivalent load resistance is possible by the power receiver providing information of the conditions at the power receiver side.

The previous text has focused on the example where the resonance modification circuit is arranged to slow the state change for the capacitive impedance 503 by diverting current from the inductive impedance 501 away from the capacitive impedance 503 during the fractional time intervals. However, in other embodiments, the resonance modification circuit 505 may be arranged to slow the state change for the inductive impedance 501 by blocking current flow from the capacitive impedance 503 to the inductive impedance 501 during the fractional time interval.

Figure 13:
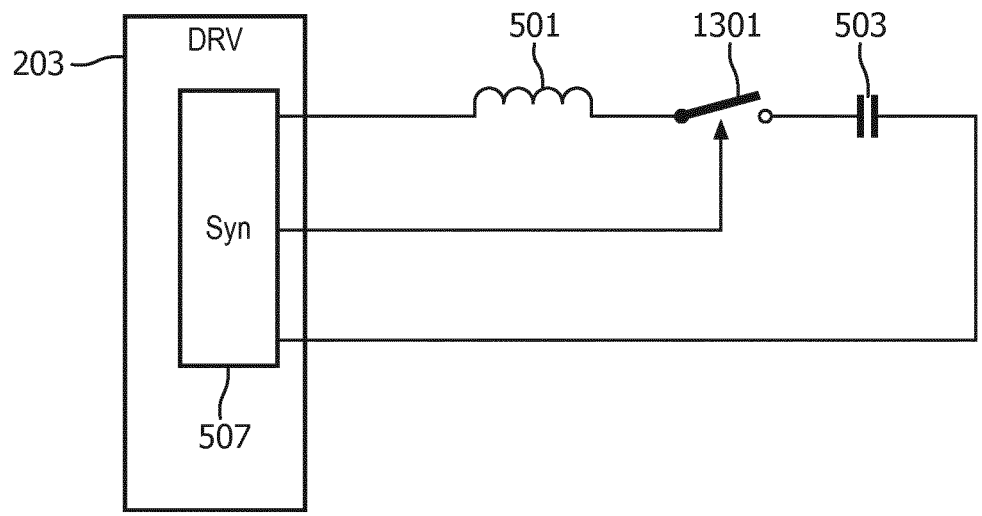
FIG. 13 illustrates an example of elements of a power transmitter in accordance with some embodiments of the invention.

For example, FIG. 13 illustrates another embodiment of the system of FIG. 5. In this example, the resonance modification circuit is arranged to slow the state change for the inductive impedance by impeding current flow (and specifically the rate of change of the current flow) from the capacitive impedance to the inductive impedance during the fractional time interval, or equivalently by reducing the voltage imposed by the capacitor over the inductive capacitance. Specifically, in the example, the resonance modification circuit is arranged to slow the state change for the inductive impedance by blocking current flow from the capacitive impedance to the inductive impedance during the fractional time interval, or equivalently by setting the inductor voltage to zero.

In the example, the current from the capacitor 503 to the inductor 501 is blocked by a switch 1301 which is in series with the inductor 501. In the example, the driver 203 is arranged to effectively disconnect the coupling between the capacitor 503 and the inductor 501 for part of resonance cycle. The driver 203 synchronizes the switch 1301 to the drive signal, and in principle operates as described for the example of FIG. 6. Indeed, in example of FIG. 6, the switch 601 is arranged to freeze the voltage across the capacitor 503 at zero by controlling the current through the capacitor 503 to be zero. In the example of FIG. 13, the switch 1301 is arranged to freeze the current through the inductor 501 at zero by disconnecting the inductor 501 from the capacitor 503 and so removing the influence of the voltage of the capacitor on the inductor. Thus, the two approaches are equivalent with the consideration that operation of a capacitor and inductor are the same when the roles of current and voltage are swapped. Indeed, the signals of FIG. 7 could also apply to the example of FIG. 13 if the curves for inductor current and capacitor voltage are swapped with respectively capacitor voltage and inductor current.

It should also be noted that in the provided examples, the state change of both the capacitor 503 and the inductor 501 are slowed, or substantially frozen, during the fractional time interval. Indeed, in the example of FIG. 6, during the fractional time interval, no current reaches the capacitor 503 and the voltage is constant at zero. However, thus also sets the voltage across the inductor 501 to zero and thus the inductor current is substantially constant, i.e. there is substantially no state change for the inductor 501. Similarly, in the example of FIG. 8, during the fractional time interval, no current can flow from the capacitor 503 and accordingly the voltage across the capacitor 503 will be substantially constant, i.e. there is substantially no state change for the capacitor 501.

In the previous examples, the start of the fractional time intervals have been synchronized with (and specifically aligned to) the zero crossings of respectively the inductor voltage and the capacitor current. In particular, the start time of the fractional time intervals are aligned with the zero crossings of respectively the capacitor voltage and the inductor current. This provides particular advantages when the current flow between the capacitor 503 and inductor 501 is reduced completely to zero during the fractional time intervals. However, it will be appreciated that in some embodiments, more gradual reductions in the current flow may be used.

It will be appreciated that the slowing of the state change, and the energy flow between the capacitor 503 and the inductor 501, may be achieved by reducing rather than completely preventing current flow between the resonating components. The reduced current may for example be achieved through a current regulating circuit which e.g. could be controlled in real time by a microcontroller.

Figure 14:
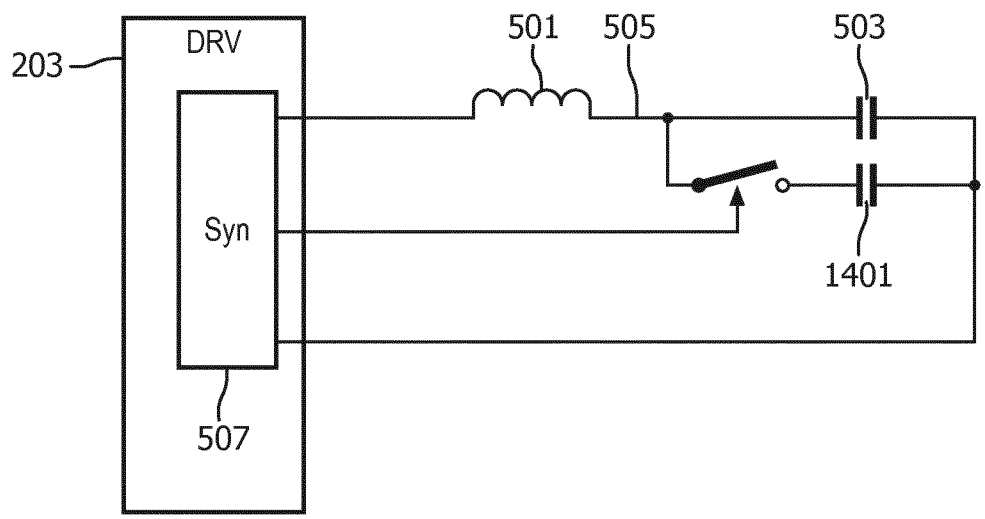
FIG. 14 illustrates an example of elements of a power transmitter in accordance with some embodiments of the invention.

However, as another example, the reduction may e.g. be achieved by including an additional capacitor or inductor during the fractional time intervals. For example, in the example of FIG. 14 an additional current reduction capacitor 1401 is inserted in series with the switch of FIG. 6. During the fractional time interval, the switch 601 does not short circuit the capacitor 503 but inserts the current reduction capacitor 1401 in parallel. This results in the current to the capacitor 503 being reduced as part of the current flows into the current reduction capacitor 1401 during the fractional time interval thereby reducing the state change of the capacitor 503 and so the voltage that the capacitor 503 imposes on the inductor. (the current reduction capacitor 1401 is charged and discharged together with the capacitor 503).

Figure 15:
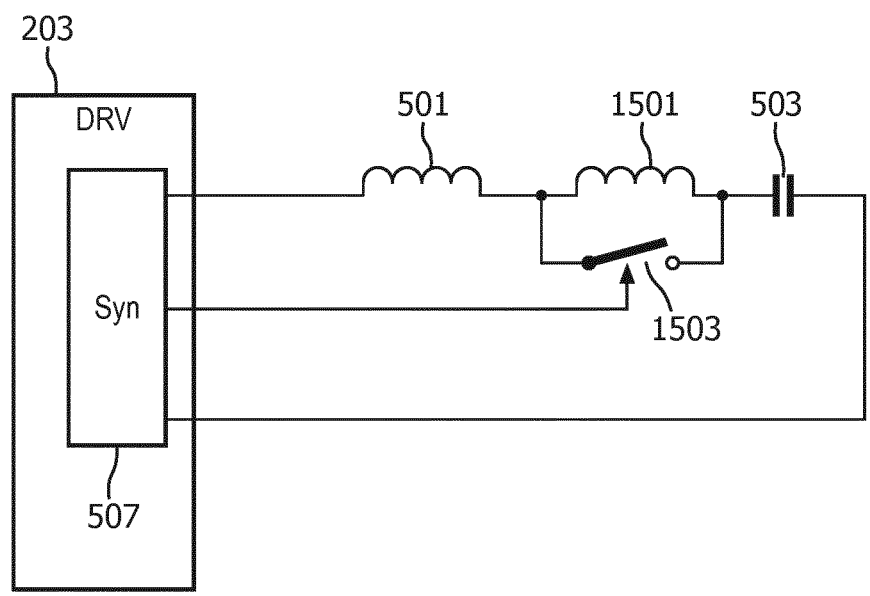
FIG. 15 illustrates an example of elements of a power transmitter in accordance with some embodiments of the invention.

The corresponding example for the inductor 501 is shown in FIG. 15. In this example, a current reducing inductor 1501 is inserted in series with the inductor 501 and the switch 1503 is coupled in parallel with the current reducing inductor 1501. In this example, the switch 1503 is open during the fractional time interval resulting in the effective inductance being increased. Accordingly, the current change through the inductor is reduced (as the voltage that the capacitor 503 imposes is now divided over the inductors 501 and 1501 and so the resulting voltage that the capacitor 503 imposes on the inductor 501 is reduced) during the fractional time interval. At the end of the fractional time interval, the switch 1503 is closed thereby short circuiting the current reducing inductor 1501.

In the following, the operation of the system will be described further with reference to a system wherein the driver 203 comprises a switching bridge/inverter for generating the drive signal. The switching bridge may specifically be a half-bridge or a full-bridge corresponding to the examples of FIGS. 3 and 4.

In the example, the driver 203 furthermore generates the timing signal to have transitions that directly control the fractional time interval. Specifically, the signal is generated to have transitions occurring at times corresponding (and typically being substantially identical, say within $\frac{1}{50}^{th}$ of a cycle time) to the start time of the fractional time interval, at times corresponding (and typically being substantially identical, say within $\frac{1}{50}^{th}$ of a cycle time) to the end time of the fractional time interval, or both at times corresponding (and typically being substantially identical, say within $\frac{1}{50}^{th}$ of a cycle time) to the start time and end time of the fractional time interval.

Furthermore, in the examples, the driver 203 is arranged to synchronize the timing signal to one (or more) of the switch signals controlling the switches of the switch bridge. Thus, as the drive signal is generated by the switching of the switches in the switch bridge, the synchronization of the timing signal, and thus of the fractional time intervals, to the switch signal also provides a synchronization to the drive signal.

Figure 16:
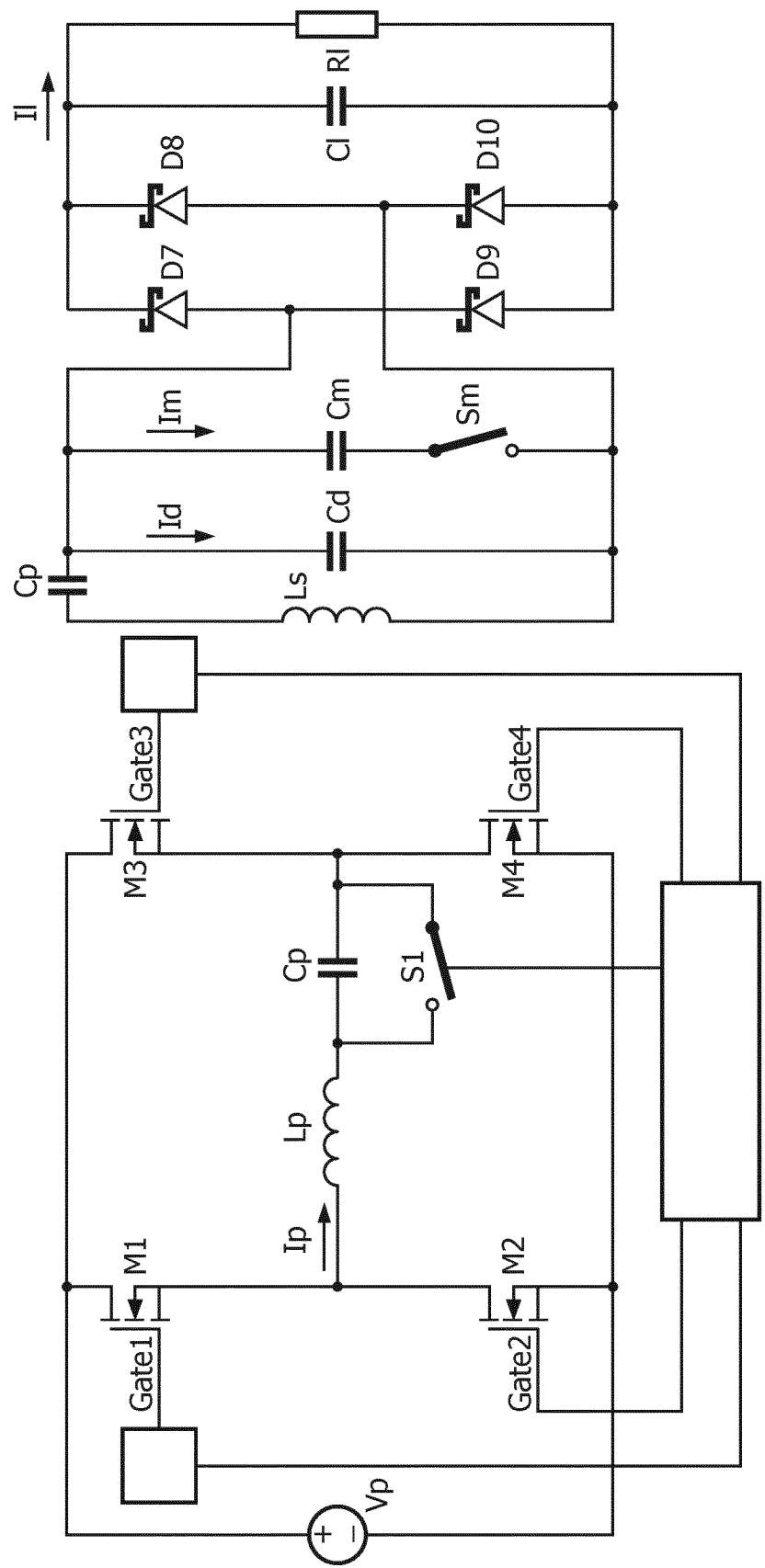
FIG. 16 illustrates an example of elements of a power transmitter in accordance with some embodiments of the invention.

FIG. 16 shows an example of an electrical model of elements of an example of the inductive power transfer system of FIGS. 1 and 2.

The transmitter resonance circuit 201 is represented by the components $C_p$, and $L_p$, (corresponding to the capacitor 503 and the inductor 501). The driver is represented by $V_p$ and the switch bridge formed by switches M1-M4 which in the specific example are FETs. The receiver resonance circuit 205 is represented by the components $C_s$, $L_s$. The capacitor $C_d$ creates a resonance at 1 MHz, which enables power transmitters that use a moveable coil to locate the power receiver (e.g. in accordance with the principles described in the Qi Wireless Power Specification (version 1.0)). The capacitor $C_m$ and switch $S_m$ represent load modulation by the power receiver 105. Diodes $D_7$ to $D_{10}$ and $C_1$ and $R_1$ represent the load of the power receiver 105 (with the diodes providing rectification).

Figure 17:
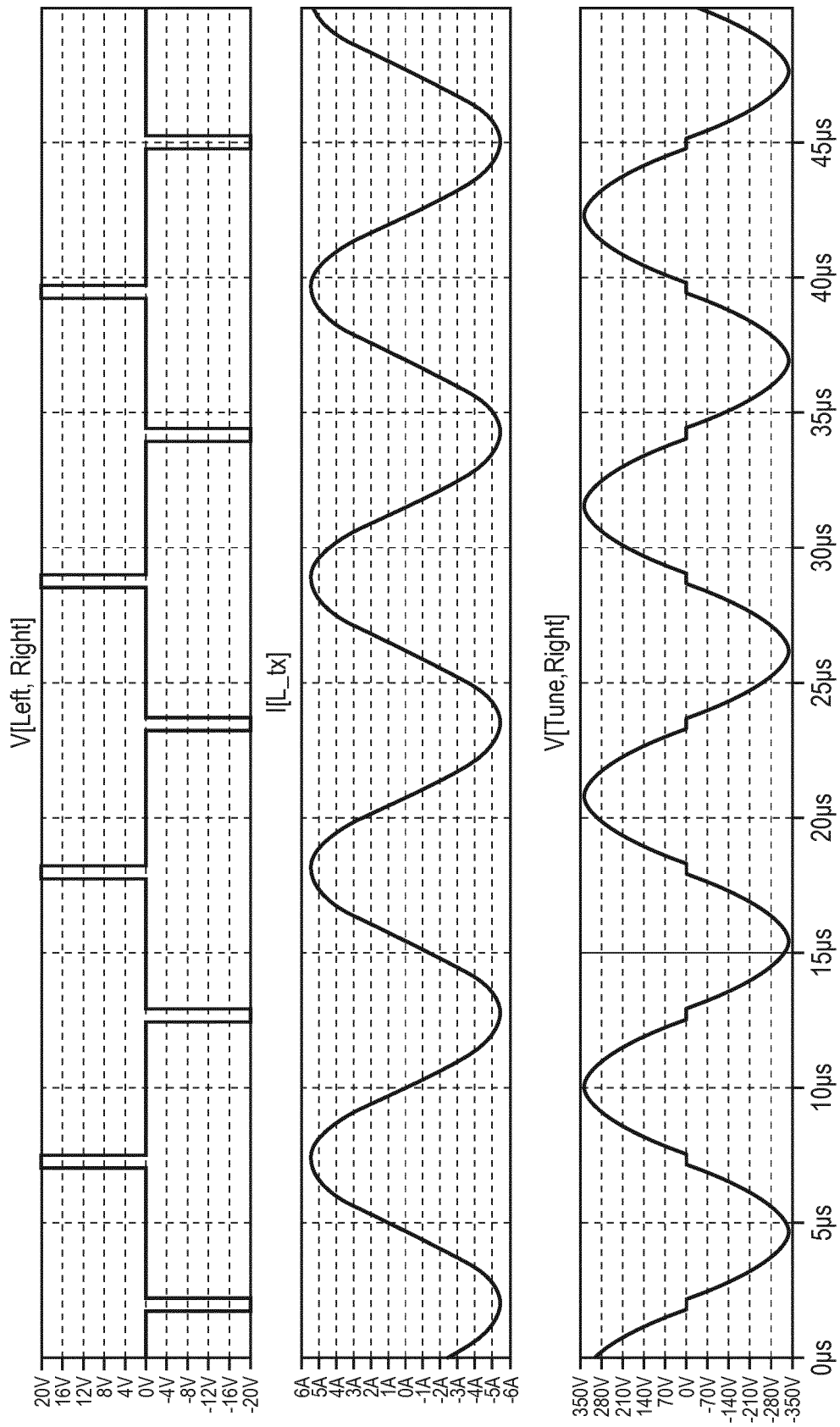
FIG. 17 illustrates examples of signals of a power transmitter in accordance with some embodiments of the invention.

In the example, when switch S1 is opened and closed with an appropriate duty cycle the effective capacitance becomes larger than the capacitance of the capacitor 503 ($C_p$) on its own. If the effective resonance frequency of the power transmitter is desired to be lower than the natural resonance frequency, then switch S1 is closed for a short period of time just after the voltage across $C_p$ passes zero voltage from negative to positive and/or vice versa. This is illustrated in FIG. 17 which first shows the drive signal and the timing signal controlling the switch S, then the current through the inductor 501, and finally the voltage across the capacitor (corresponding to FIG. 7). The drive signal is applied to the resonant circuit with a frequency $f_o$ and duty cycle D of 93 kHz and 10% respectively, i.e. the drive signal has an operating frequency of 93 kHz. In the example, the natural resonance frequency $f_n$ of the resonant tank is 100 kHz. Accordingly, the voltage across the resonance circuit (denoted V(left, right)) should for a free running resonance circuit lag the current $i_p$ (t), meaning that it is in capacitive mode operation. However, in the system of FIG. 16, the switch S1 short circuits the capacitor $C_p$ such that the first harmonic of the voltage V(left, right) and the current $i_p$(t) are in phase, meaning that the power transmitter operates in resonance. Thus, this resonance is achieved by prohibiting the voltage across capacitor $C_p$ from increasing (or decreasing) just after the event of a zero crossing of the voltage $V(C_p)$ by closing switch S1 with an appropriate duty cycle. This effectively diverts the current from the inductor away from the capacitor $C_p$.

Figure 18:
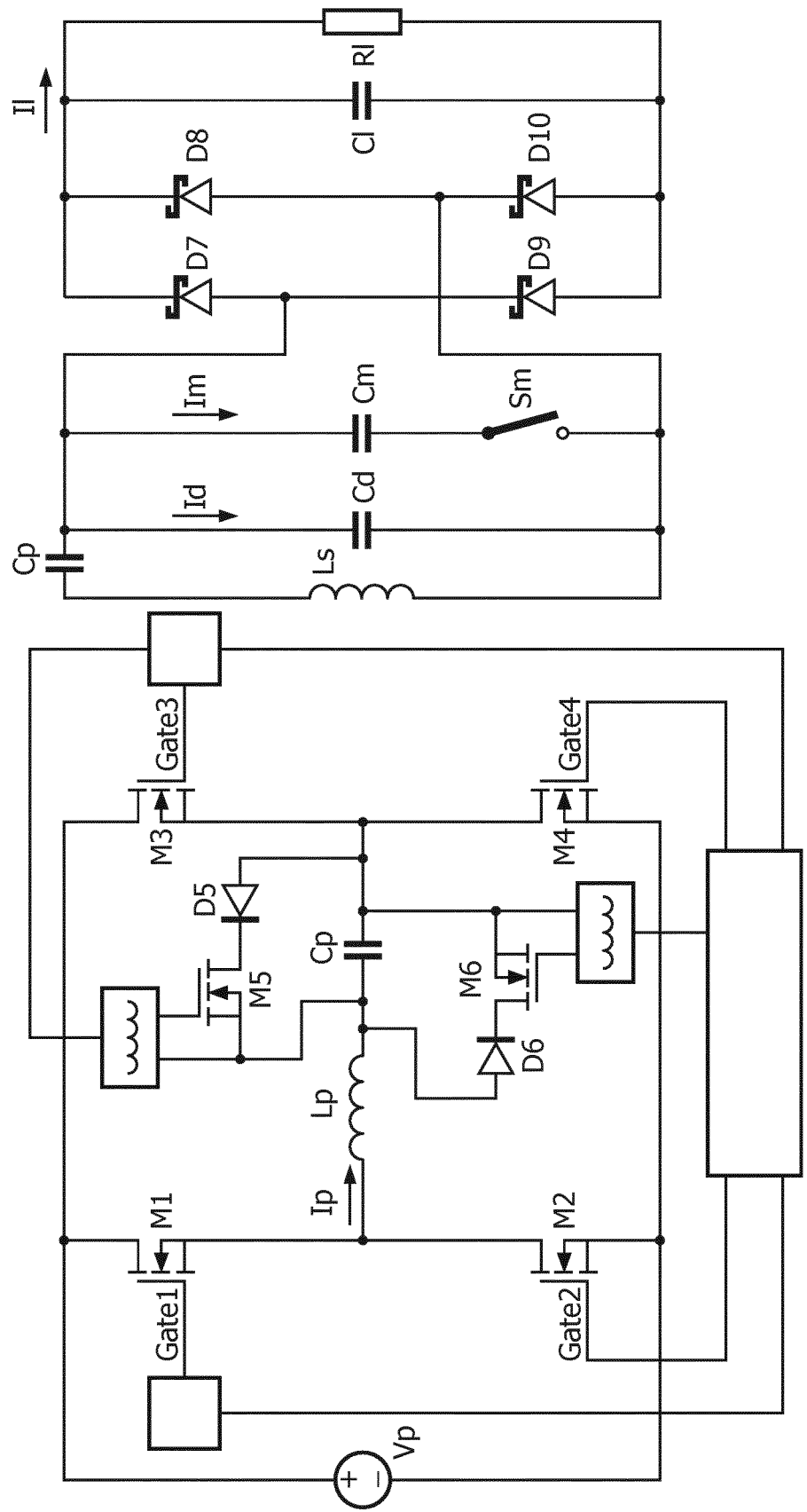
FIG. 18 illustrates an example of elements of a power transmitter in accordance with some embodiments of the invention.

An example of an approach which in many embodiments will be more practical than the example of FIG. 16 is provided in FIG. 18. In the example, of FIG. 18, a simplification of the timing of FIG. 16 is achieved which may provide additional flexibility.

In the example of FIG. 18, the switch is replaced by two current diversion paths with one providing a short circuit for current flowing in one direction, and one for current flowing in the other direction. In the example, each current diversion path includes a rectifier (specifically a diode) which ensures that the current can only flow in one direction for that path.

In this example, the positive current through the resonant tank is now shunted by D6/M6 and the negative current is shunted by D5/M5. Diodes D5 and D6 prevent the body diodes of M5 and M6 from conducting. Switch/FET M6 is controlled by exactly the same signal as Switch/FET M4, i.e. in the example the switch signal for controlling the timing of the fractional time interval is exactly the same as the switch signal for one of the switches of the switch bridge. Indeed, at least one of the begin and end times of the fractional time interval is not only synchronized with, but also coincides with a switching of one of the switches of the switching bridge generating the drive signal.

Indeed, when switch M4 is conducting, the voltage $V(C_p)$ is resonating from negative to positive. When this voltage becomes positive, diode D6 starts conducting immediately because switch M6 is already in the on-state. In this way, the current through $i_p(t)$, commutates naturally from capacitor $C_p$ towards D6/M6 without the need for complex timing control. This is further illustrated in FIG. 19.

A similar situation occurs for the second path of M5/D5. Indeed, in this example, the control switch signal for the switch M5 is directly generated to coincide with the switching of M3.

In the example, each of the current diverting paths (D5/M5 and D6/M6) accordingly comprises both a switch and a rectifier. This allows a more flexible timing of the fractional time interval.

Specifically, the use of both a switch and a rectifier allows the power transmitter to align one of the start time and the end time of the fractional time intervals to the transitions in the timing signals whereas the other is automatically generated by the rectifier, i.e. it is determined by the rectifier switching between a conductive and non-conductive state.

In the example of FIG. 18, the switch may be switched into a conductive state during the time when the voltage of the capacitor is negative. However, due to the diode D6, the current diversion path of D6/M6 does not conduct any current and thus does not divert any (negative or positive) current from the capacitor 503. Thus, the exact timing of the switching on of the switch M6 is irrelevant, as this does not constitute the beginning of a fractional time interval in which current is diverted away.

However, shortly after a zero crossing of the voltage across the capacitor 503, the diode D6 will begin to conduct (as soon as the voltage is sufficiently high to provide sufficient forward bias). Thus, when the diode D6 switches from the non-conductive to the conductive state, the current diversion path begins to divert current from the inductor 501 away from the capacitor 503. Thus, the start of the fractional time interval is controlled by the diode switching from the non-conductive to the conductive state and is not dependent on when the switch M6 switches. Thus, the start time of the fractional time interval may not be aligned to the timing signal.

The current diversion path will continue to divert current until the switch M6 is switched to the open state (as long as there is current flowing from the inductor in the forward direction of diode D6). Thus, the end time of the fractional time interval is aligned with the transitions of the timing signal, and thus with the transitions of the switch signal for switch M4.

Figure 19:
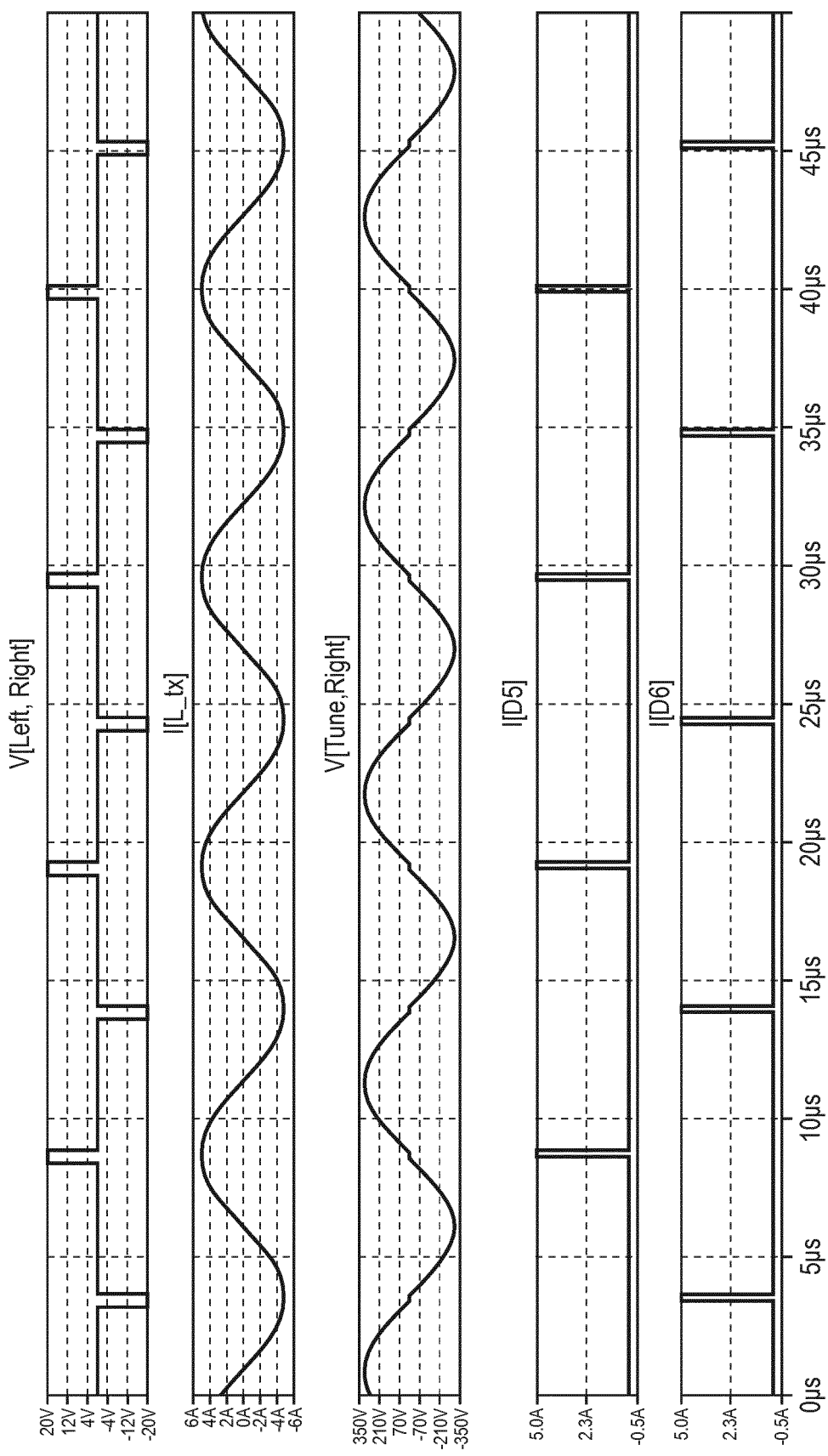
FIG. 19 illustrates examples of signals of a power transmitter in accordance with some embodiments of the invention.

Accordingly, in the example of FIG. 18, and as illustrated by FIG. 19, the power transmitter is arranged to align the start time of the fractional time intervals to the rectifier (diode D6) switching from a non-conductive to a conductive state whereas the end time is aligned to the transitions in the timing signal, and thus to the transitions in the switch signal. Indeed, the same switch signal may be used both for the switch of the current diversion path and for the switch of the switch bridge.

It will be appreciated that in other embodiments, the same principles may e.g. be applied to control the end of the fractional time interval in response to a rectifier switching conductive state, including potentially ending the fractional time interval when a rectifier switches from the conductive to the non-conductive state. Such implementations may e.g. be useful when blocking of current to the inductor is employed, e.g. instead of diverting current from the capacitor.

The approach has a number of particular advantages. Indeed, it allows for an automatic synchronization of the start of the fractional time intervals to zero crossings of the capacitor voltage and/or of the inductor current. Thus, it automatically aligns the start of the fractional time interval to times when the components may easily be short circuited or disconnected, thereby allowing a lower complexity embodiment.

Another significant advantage is that it provides additional flexibility in generating the drive signal and the switch signal for the switch bridge. Specifically, as the fractional time intervals are only synchronized to one edge of the switch signals, the other can (within reason) be freely varied. This specifically allows the duty cycle to be varied and thus allows the driver to dynamically vary the power level of the generated power transfer signal without changing e.g. the operating frequency or the amplitude level of the signal.

Indeed, the approach allows for a much simplified generation of the drive signal. Specifically, instead of switching on the corresponding switches of the switch bridge (M1/M4 and M2/M3 respectively) only during the relatively short time interval in which drive signal is active (i.e. as in the first curve of FIG. 19), all of the switches can be operated by substantially square wave signals with a duty cycle of 50%. The duty cycle of the drive signal may then be generated by the relative phase difference between these drive signals. However, as only one of the edges controls the timing of the fractional time intervals, this does not affect the fractional time interval.

Furthermore, the approach still ensures that the first power receiver 105 and the operating frequency are inherently locked together with the same value. Specifically, this results from the fact that the oscillations of the resonance circuit 201 are effectively restarted for every cycle of the drive signal.

It should be noted that in the example of FIG. 18, the voltage levels in the system typically requires that the switches controlling the fractional time interval (i.e. switch M5 and M6) are driven through high voltage level shifters, which is typically implemented using two extra pulse transformers.

Figure 20:
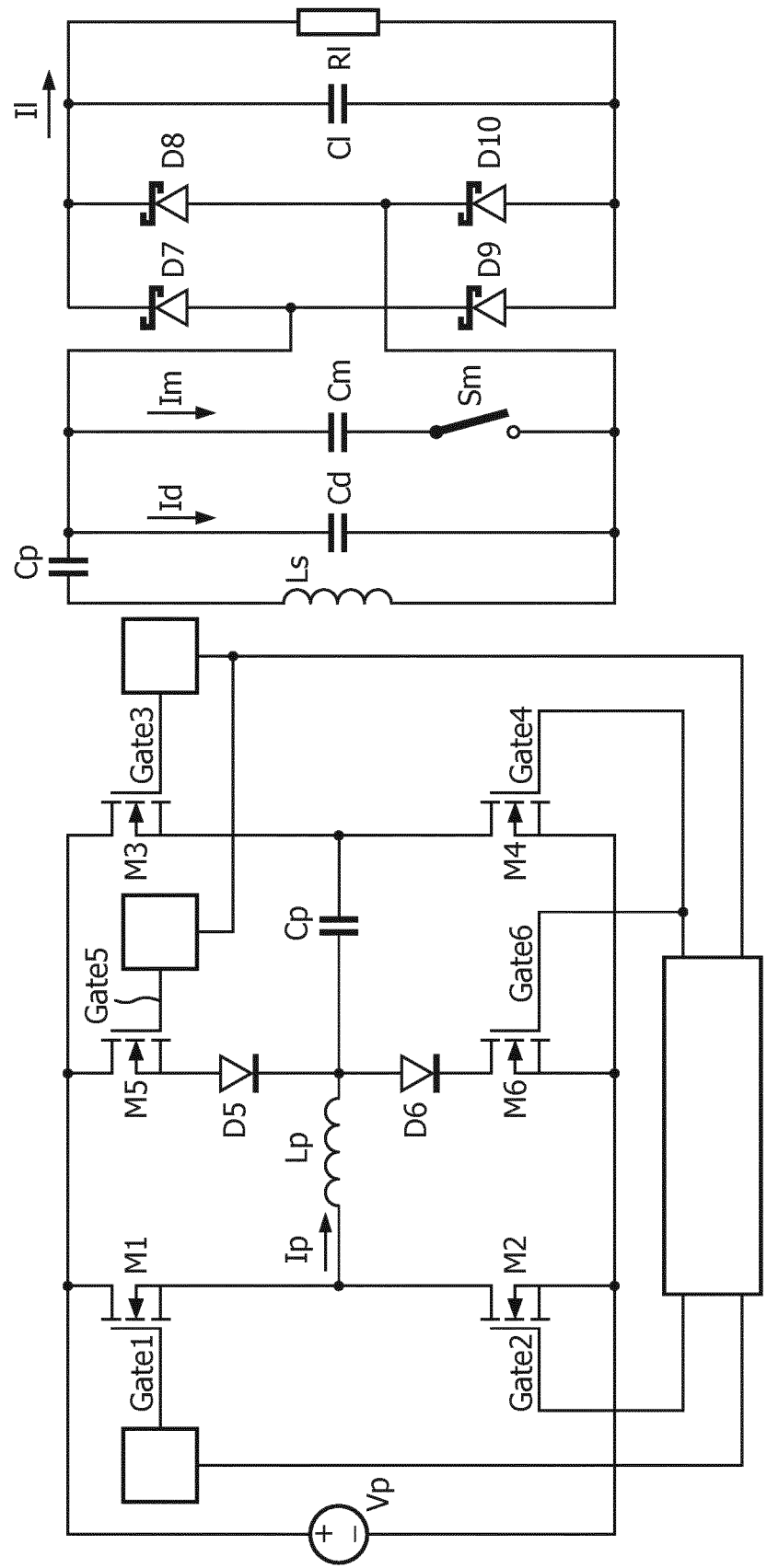
FIG. 20 illustrates an example of elements of a power transmitter in accordance with some embodiments of the invention.

However, this may be partly avoided in the system of FIG. 20 (specifically the high voltage level shifter can be avoided for switch M6). In this example, two current diversion paths are coupled between the junction point of the inductor 501 and the capacitor 503 and the power rails for the power supply to the switching bridge.

The operation of the system of FIG. 20 is similar to the example of FIG. 18 and simply provides a different path back to the power supply for the current being diverted. However, an important difference is that switches M5 and M6 are referenced to respectively the voltage rail and ground for the inverter, i.e. to fixed voltages. This may substantially facilitate driving of the switches, e.g. when these are implemented as MOSFETs. In the example, switch M6 can be implemented by a MOSFET being driven directly by the same switch signal as M4. However, a MOSFET implementing M5 would still require a pulse transformer as the voltage of the source of this MOSFET will have negative voltage values.

Figure 21:
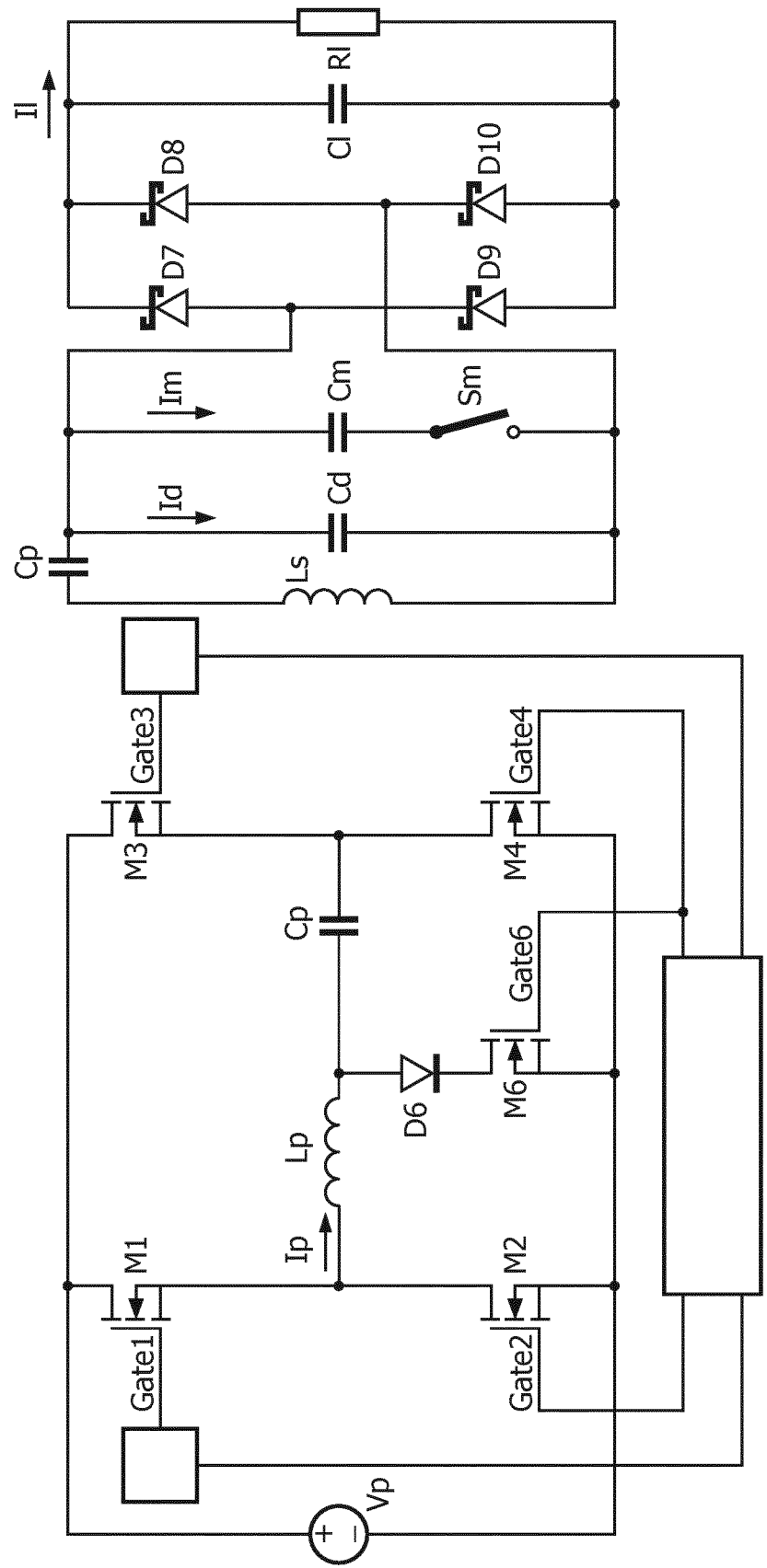
FIG. 21 illustrates an example of elements of a power transmitter in accordance with some embodiments of the invention.

FIG. 21 illustrates a modification of the system of FIG. 20. In this example, the current diversion path to the voltage rail, i.e. the current diversion path comprising D5/M5 have been completely removed. Although this system introduces fractional time intervals only for half of the zero crossings (i.e. only one zero crossing per cycle), it has been found to provide an effective adjustment of the effective resonance frequency.

Thus, in the system of FIG. 21, a current diversion path comprises a switch and rectifier coupled in a series configuration and with one end of the current diversion path being coupled to the junction point between the inductor and capacitor and the other end of the current diversion path being coupled to the ground supply rail for the switching bridge. In the system, and rectifier aligns the start times of the fractional time intervals to the time when the rectifier switches from a non-conductive to a conductive state, whereas the end times of the fractional time interval are aligned to the switching of switch M4 of the switching bridge.

The approach allows for a very low complexity approach for adapting the resonance frequency of a power transmitter such that it matches the drive signal. The approach can specifically provide an automatic system wherein the frequency of the drive signal is always the same as the resonance frequency of the transmitter resonance circuit, and vice versa.

Figure 22:
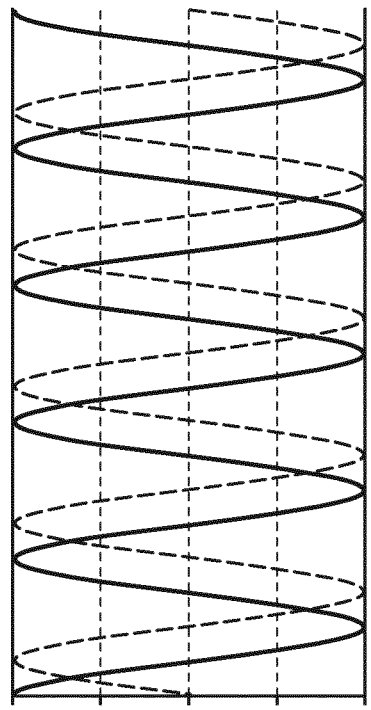
FIG. 22 illustrates an example of elements of a power transmitter in accordance with some embodiments of the invention.
Figure 22:
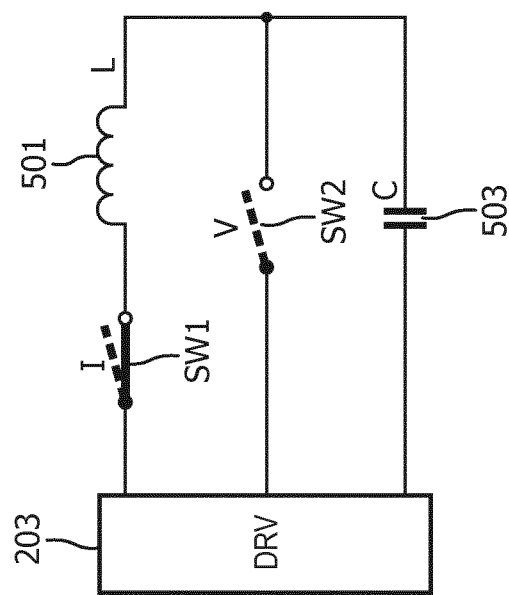

To illustrate the locking of the operating frequency and the transmitter resonance frequency, the system of FIG. 22 may be considered. The example illustrates the driver 203 driving the resonant circuit comprising the inductor 501 (L) and the capacitor 503 (C). If the driver applies a step voltage to the resonant circuit, it starts to oscillate at the well-known resonance frequency $f=1/2\pi\sqrt{LC}$. These oscillations are visible in the current I(drawn line) running through the system, and the voltage V (dashed line) at the junction between the inductor 501 and the capacitor 503. In the presence of damping, the oscillations die out after some time, leading to a steady state in which the capacitor 503 is charged to the step voltage of the driver 203. In practice, the resonant circuit has a high Q factor, i.e. low damping, which means that the oscillations continue for many periods of the resonant frequency.

If the driver 203 applies a signal at a frequency that is equal to the resonance frequency, the oscillations can be sustained indefinitely, even in the presence of damping. In this case, the very high currents can run through the circuit. However, if the driver 203 applies a signal at a frequency that is different from the resonance frequency, the system will not "swing" very well, resulting in much lower current running through the circuit. In fact, in the latter case, the current and voltage signals in the circuit will contain two frequencies, namely the driving frequency and the resonance frequency, where the resonance frequency will be more pronounced with a higher Q factor of the resonant tank circuit. The two frequencies in the current and voltage signals lead to a beat frequency on their amplitude—this is sometimes also (incorrectly) referred to as intermodulation between the two frequencies. In a wireless power transfer system, which relies on amplitude modulation—as achieved through load modulation on the power receiving side of the system—this can make reliable communications difficult, if not impossible. It is therefore advantageous, if not essential in certain cases, to operate the system at a frequency that is equal to the resonance frequency.

Figure 23:
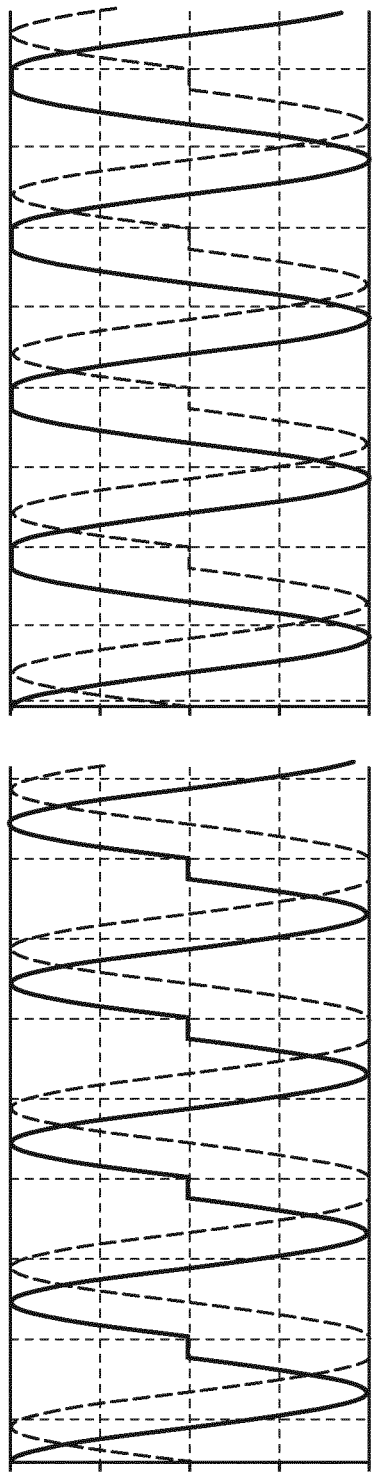
FIG. 23 illustrates examples of signals of a power transmitter in accordance with some embodiments of the invention.

By closing either switch SW1 or SW2 after the completion of a cycle of the oscillations at the resonance frequency, further oscillations at that frequency will be inhibited. In other words, the state of change of the current and voltage signals in the circuit will be slowed down—to zero in this example. Opening the switch again at the start of the next cycle of the driving signal restarts the oscillation at the resonance frequency, as if the driving signal was applied for the first time. This means that the phases of the current signal or voltage signal are reset to match the phase of the driving signal. In other words, the frequency of the cycles in the circuit becomes effectively equal to the driving frequency—but they no longer have a sinusoidal shape. In FIG. 23, the left-hand side shows the resulting waveforms for closing SW1 at a negative-to-positive zero crossing of the current, and the right-hand side figure shows the resulting waveform for closing SW2 at a negative-to-positive zero crossing of the voltage. The drawn waveforms represent the current; the dashed waveforms represent the voltage; and the dotted lines represents the driving signal—in this case a square wave.

It should be noted that depending on the difference between the driving frequency and the resonance frequency, the system may also work to effectively suppress the beats in the current and voltage signals by operating the switch(es) once every few cycles, as opposed to once every cycle. For example, if the driving frequency approaches the resonance frequency, the frequency of the beats increases and the resulting changes in the amplitude take multiple cycles to build up. Resetting the phases every few cycles is in that case sufficient to keep the sensitivity for load-modulation based communications on a sufficient level, while reducing potential losses in the system, which may arise from operating the switch(es).

Synchronizing the operation of the switches can be achieved in many ways such as e.g. described previously for the various different embodiments. Opening the switch is most easily synchronized with an edge—e.g. a rising edge—of a square wave or pulse wave driving signal. For closing the switch, a measurement system can be added to the tank circuit, which triggers on a negative-to-positive zero crossing of the current or voltage signal. Someone skilled in the art will be able to design many kinds of circuits that perform this functionality.

In the case of a wireless power system that comprises a single driver driving multiple tank circuits in parallel, which is an advantageous implementation to achieve greater (lateral) positioning tolerance of the power receiver, it is difficult—if not impossible—to operate the system at the resonance frequency. The reason is that due to natural spread in inductance and capacitance values of the components that are used to implement the wireless power system, each resonant tank circuit typically has a different resonance frequency. By limiting the Q factor of each resonant tank circuit, the current and voltage signal component at the resonance frequency can be kept small relative to the signal component at the drive frequency. This keeps the beats on the amplitude in check, such that communications based on amplitude modulation remain possible. However, a disadvantage of this approach is that a low Q factor requires a relatively high coupling in order to keep the efficiency of the power transfer up to the mark. In other words, the low Q factor does not permit a large distance between the power transmitting and receiving parts of the system.

By inhibiting the free-running oscillations as described above, the beats between the various frequencies in the system—the driving frequency as well as the different resonance frequencies of the multiple resonant tank circuits—can be kept in check, enabling communications by means of amplitude modulation. In other words, it becomes possible to realize a high-Q multi-coil or array-based power transmitter that is able to demodulate amplitude communications from a power receiver that is positioned at a much larger distance.

The Inventors have realized that locking these frequencies closely together can in particular provide improved communication performance when load modulation is used.

In many embodiments, the power transmitter 101 may be arranged to receive data messages from the power receiver 105. Specifically, power transmitter 101 may be arranged to demodulate load modulation of the wireless inductive power transfer signal to determine the corresponding data transmitted from the power receiver 105.

On the physical level, the communication channel from the power receiver 105 to the power transmitter 101 is implemented by using the wireless inductive power transfer signal as a communication carrier. The power receiver 105 transmits data messages by modulating the load of the receiver coil 107. The power receiver 105 may for example do this by connecting and disconnecting a capacitor coupled in parallel to the receive coil 107 thereby changing the resonance, and thus load characteristics of the power receiver 105. These changes result in corresponding variations in the power transfer signal at the power transmitter side, and specifically in variation in the current and voltage of the transmitter inductor 103. These changes are directly or indirectly detected by the power transmitter 101 and used to demodulate the load modulation data from the power receiver 105.

Specifically, the load modulation may e.g. be detected by a change in the amplitude and/or phase of the drive signal current/voltage, by a change in the current/voltage of the transmitter inductor 103, and/or a change of current/voltage of a resonance circuit. As another example, the load modulation may be detected by a change in the current of the power supply to the driver 203 (specifically to the inverter/switch bridge).

The power receiver 105 can accordingly load modulate data onto the power transfer signal which the power transmitter 101 can then demodulate. The approach may for example correspond to that described for Qi in "System description, Wireless power Transfer, Volume I: Low Power, Part 1: Interface Definition, Version 1.0 July 2010, published by the Wireless power Consortium" available via http://www.wirelesspowerconsortium.com/downloads/wireless-power-specification-part-1.html, also called the Qi wireless power specification, in particular chapter 6: Communications Interface (or in subsequent versions of the Specification).

The load modulation is specifically used to adapt the power transfer, and in particular to implement a power control loop that continuously adapts the transmitted power level based on power control messages received from the power receiver 105. The power control messages are communicated by load modulation.

The described approach wherein the operating frequency and the transmitter resonance frequency are automatically the same may provide substantially improved performance in many embodiments. Indeed, the Inventors have realized that substantially reduced intermodulation can be achieved by linking these frequencies.

The effect and realization may be illustrated by considering some practical examples. Specifically, the equivalent circuit of FIG. 24 may be considered.

Figure 24:
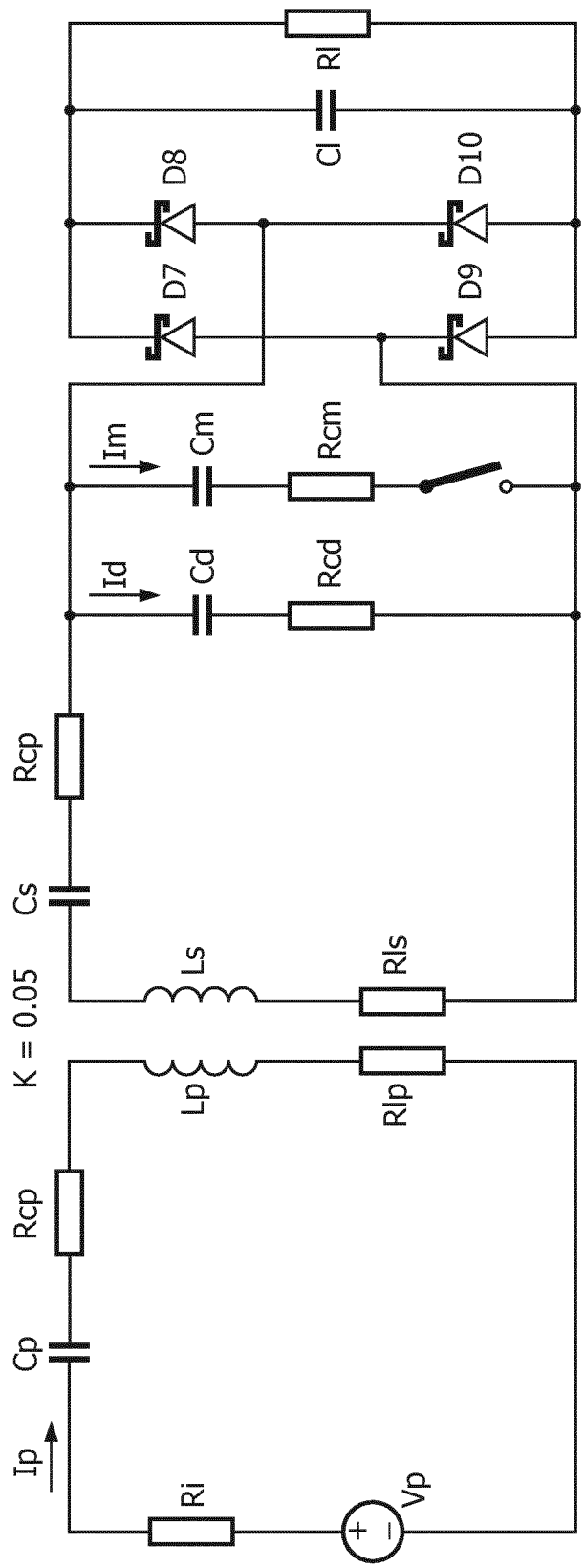
FIG. 24 illustrates an example of elements of a power transmitter in accordance with some embodiments of the invention.

The diagram of FIG. 24 represents a simple electrical model of the inductive power transfer system of FIGS. 1 and 2.

The transmitter resonance circuit 201 is represented by the components $C_p$, $R_{cp}$, $R_{lp}$, and $L_p$, where the resistors represent losses). The driver is represented by $V_p$ and $R_i$. The receiver resonance circuit 205 is represented by the components $C_s$, $R_{cs}$, $R_{ls}$, and $L_s$, where the resistors represent losses). The capacitor $C_d$ (with resistor $R_{ed}$ representing losses) creates a resonance at 1 MHz, which enables power transmitters that use a moveable coil to locate the power receiver. The capacitor $C_m$ (with resistor $R_{cm}$ representing losses) and switch $S_m$ represent the load modulation by the power receiver 105. Diodes $D_7$ to $D_{10}$ and $C_1$ and $R_1$ represent the load of the power receiver 105 (with the diodes providing rectification).

The circuit has been simulated for values typical of a Qi wireless power transfer system. In such a system, the transmitter resonance frequency is in the interval of $f_p$=(93±7) kHz, and the receiver resonance frequency is in the interval of $f_s$=(100±5) kHz. The coupling factor k between the two is equal to $M/\sqrt{L_p L_s}$, with M the mutual inductance between the two coils. In the examples, the coupling factor k is set to a value of 0.05.

In the example the operating frequency $f_o$ and duty cycle D=Ton/T of the drive signal may be varied, e.g. to provide the desired power transfer characteristics.

The circuit has been analyzed with the following exemplary values:

| Power transmitter | | | Power receiver | | |
|---|---|---|---|---|---|
| $L_p$ | 100 | μH | $L_s$ | 20 | μH |
| $f_p$ | 93 | kHz | $f_s$ | 100 | kHz |
| $Q_p$ | 30 | | $Q_s$ | 25 | |
| $v_p$ | 20 | V | $C_m$ | 22 | nF |
| D | 0.1 | | $C_l$ | 10 | μF |
| $R_i$ | 0.5 | Ω | $R_{cs}$ | 0.25 | Ω |
| $R_{cp}$ | 0.25 | Ω | $R_{ed}$ | 0.25 | Ω |
| $f_{ping}$ | 175 | kHz | $R_{cm}$ | 0.25 | Ω |
| | | | $v_{L,0}$ | 5.0 | V |
| | | | $P_{L,0}$ | 5.0 | W |

Figure 25:
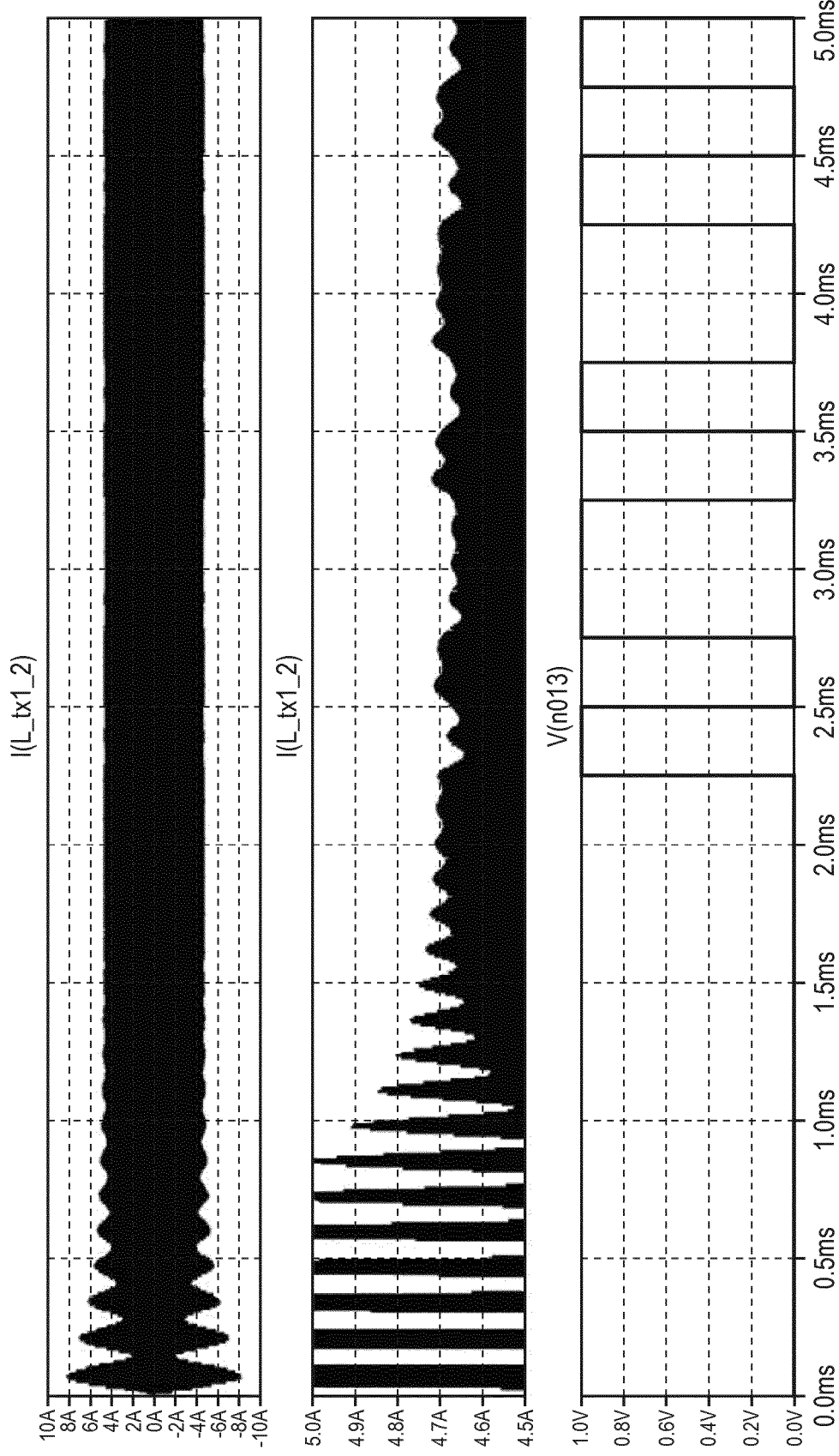
FIGS. 25 and 26 illustrate examples of signals of a power transmitter in accordance with some embodiments of the invention.

FIG. 25 illustrates the simulation results for the following parameters: k=0.05, $f_o$=100 kHz, $f_p$=93 kHz, $f_s$=100 kHz.

The two first curves illustrate the current through the transmitter inductor 103 ($L_p$) with the second curve illustrating a magnified view. The lowest curve shows the load modulation by the power receiver (specifically the switch signal for switch $S_m$).

As can be seen, when the power transfer signal is first switched on, an oscillation occurs. Essentially, the power transmitter operates similarly to an under damped resonance circuit. Indeed, the oscillation can be considered an intermodulation effect between the drive signal and the transmitter resonance circuit 201. Thus, the oscillation represents intermodulation with a frequency of $f_o-f_p$=7 kHz. It can also be seen that the oscillations gradually subside and are effectively attenuated at t=2.0 ms (mainly due to the load of the power receiver).

In the example, load modulation starts at t=2.25 ms with the example providing a load modulation corresponding to a burst signal with a modulation clock frequency of $f_m$=2 kHz. As can be seen, the step changes of the load modulation effectively excites the intermodulation resulting in oscillations, i.e. the load modulation steps can be considered a step function exciting the under damped resonance circuit. As can be seen, the oscillations are significant and may exceed or substantially reduce the difference caused by the variation of the load modulation data. This may substantially reduce the reliability of the demodulation and even in many scenarios prevent reliable demodulation (compensating for the oscillations in the demodulation will require very complex and typically costly functionality).

Figure 26:
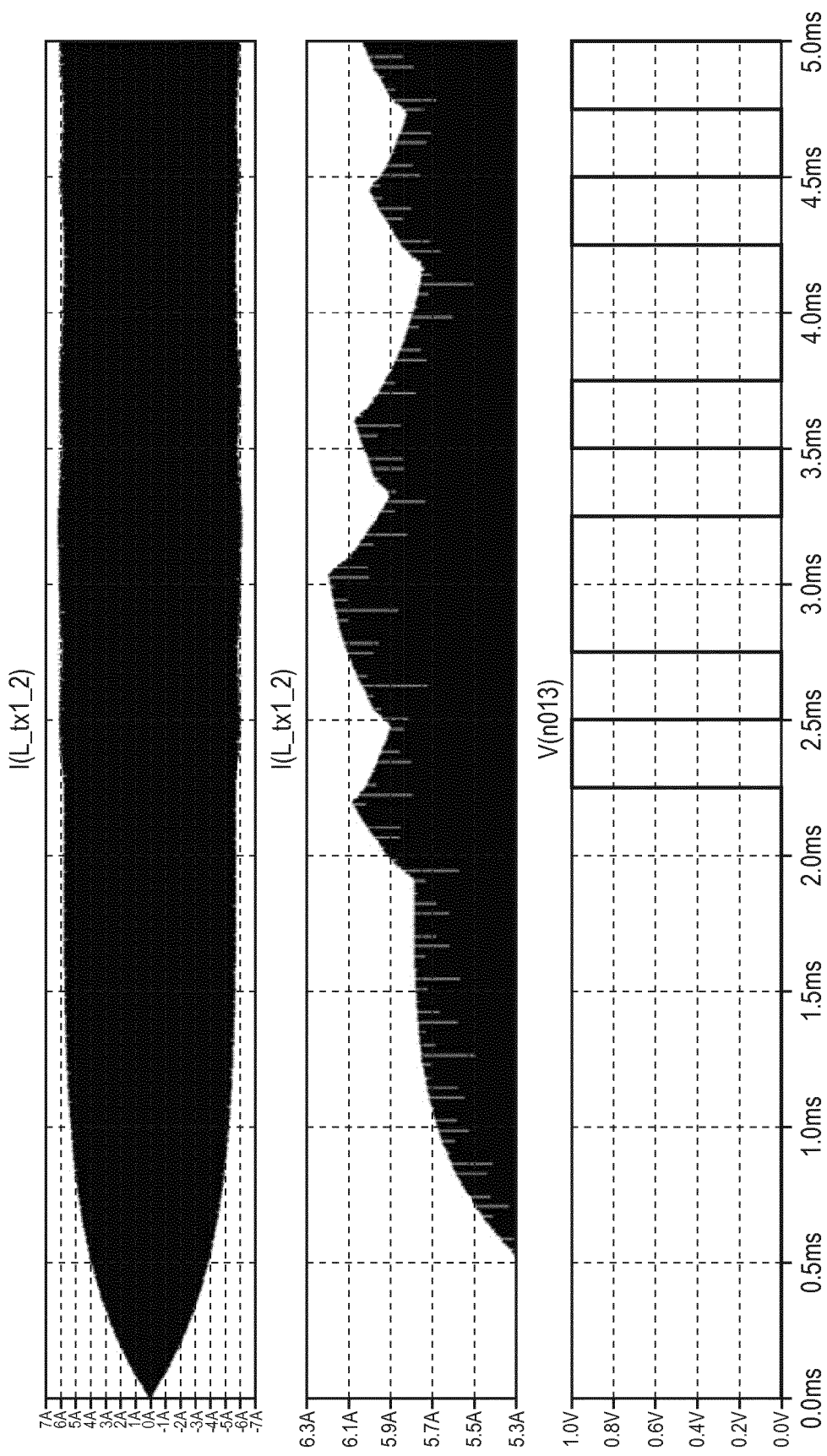

FIG. 26 illustrates the simulation results for the following parameters: $k=0.05$, $f_o=93$ kHz, $f_p=93$ kHz, $f_s=100$ kHz. Thus, in this example the operating frequency and the transmitter resonance frequency are set to the same value.

As can be seen, this effectively removes the oscillations. Indeed, the circuit may still be considered to correspond to an under damped resonance circuit but no intermodulation effects are present. As a result, the demodulation of the data may be facilitated substantially and a much more reliable demodulation can be performed.

Thus, as illustrated, by ensuring that the operating frequency and transmitter resonance frequency are the same, improved demodulation of load modulation can be achieved.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A power transmitter for inductively transferring power to a power receiver, the power transmitter comprising:
   a resonance circuit comprising a capacitive impedance and an inductive impedance,
      wherein the inductive impedance comprises a transmitter inductor,
      wherein the transmitter inductor generates a power transfer signal for wirelessly transferring power to the power receiver;
   a driver that generates a drive signal for the resonance circuit,
      wherein the drive signal has a drive frequency;
   a resonance modification circuit,
      wherein the resonance modification circuit aligns a resonance frequency of the resonance circuit with the drive frequency by slowing a state change for at least one of the capacitive impedance and the inductive impedance for a fractional time interval of each of at least a plurality of cycles of the drive signal;
   a load estimator,
      wherein the load estimator provides a load estimate,
      wherein the load estimate reflects an equivalent load resistor for the transmitter inductor,
      wherein the equivalent load resistor reflects a loading of the power transfer signal; and
   a drive frequency adapter,
      wherein the drive frequency adapter adapts the drive frequency in response to the load estimate;
      wherein the drive frequency adapter adapts the drive frequency to be a first distance away from a resonance frequency of a power receiving resonance circuit of the power receiver for a load estimate indicative of a first equivalent parallel load resistance,
      wherein the drive frequency adapter adapts the drive frequency to be a second distance away from a resonance frequency of a power receiving resonance circuit of the power receiver for a load estimate indicative of a second equivalent parallel load resistance,
      wherein the first distance is greater than the second distance, and
      wherein the first equivalent parallel load resistance is lower than the second equivalent parallel load resistance.

2. The power transmitter of claim 1, wherein a loading of the power transfer signal has a resistive component and a reactive component, and the load estimate is indicative of only the resistive component.

3. The power transmitter of claim 1, further comprising a receiver that detects messages that are load modulated onto the power transfer signal by a varying reactive load.

4. The power transmitter of claim 1, wherein the drive frequency adapter determines an operating range for the drive frequency in response to the load estimate and restricts the drive frequency to the operating range.

5. The power transmitter of claim 4, wherein the drive frequency adapter adapts the drive frequency within the operating range in response to an operating parameter other than the load estimate.

6. The power transmitter of claim 1, wherein the drive frequency adapter operates a feed-forward adaptation of the drive frequency in response to the load estimate, and operates a control loop adaptation of the drive frequency in response to an operating parameter other than the load estimate.

7. The power transmitter of claim 1, wherein the drive frequency adapter adapts the drive frequency in response to a power loss of the resonance circuit.

8. The power transmitter of claim 1, further comprising a modulation depth estimator,
wherein the modulation depth estimator determines a modulation depth estimate for a load modulation of the power transfer by the power receiver; and
wherein the drive frequency adapter adapts the drive frequency in response to the modulation depth estimate.

9. A power transmitter for inductively transferring power to a power receiver, the power transmitter comprising:
a resonance circuit comprising a capacitive impedance and an inductive impedance,
wherein the inductive impedance comprises a transmitter inductor,
wherein the transmitter inductor provides a power transfer signal for wirelessly transferring power to the power receiver;
a driver that provides a drive signal for the resonance circuit,
wherein the drive signal has a drive frequency;
a resonance modification circuit,
wherein the resonance modification circuit aligns a resonance frequency of the resonance circuit with the drive frequency by slowing a state change for at least one of the capacitive impedance and the inductive impedance for a fractional time interval of each of at least a plurality of cycles of the drive signal;
a load estimator,
wherein the load estimator provides a load estimate,
wherein the load estimate reflects an equivalent load resistor for the transmitter inductor,
wherein the equivalent load resistor reflects a loading of the power transfer signal; and
a drive frequency adapter,
wherein the drive frequency adapter adapts the drive frequency in response to the load estimate;
wherein the drive frequency adapter adapts the drive frequency to be a first distance away from a natural resonance frequency of the capacitive impedance and inductive impedance for a load estimate indicative of a first equivalent parallel load resistance;
wherein the drive frequency adapter adapts the drive frequency to be a second distance away from a resonance frequency of a power receiving resonance circuit of the power receiver for a load estimate indicative of a second equivalent parallel load resistance,
wherein the first distance is greater than the second distance,
wherein the first equivalent parallel load resistance is higher than the second equivalent parallel load resistance.

10. The power transmitter of claim 1, further comprising a receiver that receives messages from the power receiver,
wherein the messages comprise load indications that are indicative of a resistive loading of the power transfer signal by the power receiver, and
wherein the load estimator determines the load estimate in response to the messages.

11. The power transmitter of claim 1, wherein a natural resonance frequency corresponding to the capacitive impedance and the inductive impedance exceeds a maximum allowable resonance frequency for the power receiver.

12. The power transmitter of claim 1,
wherein the drive frequency adapter sets the drive frequency such that a difference between the drive frequency and a natural resonance frequency corresponding to the capacitive impedance and inductive impedance is above a first value when the load estimate is indicative of an equivalent parallel load resistance above a first threshold, and
wherein the drive frequency adapter sets the drive frequency such that the difference is below a second value for the load estimate being indicative of an equivalent parallel load resistance below a second threshold,
wherein the first value is higher than the second value, and
wherein the first threshold being higher than the second threshold.

13. The power transmitter of claim 1,
wherein the drive frequency adapter adapts the drive frequency in response to the load estimate during a power transfer phase.

14. A method of operation for a power transmitter inductively transferring power for to a power receiver, the power transmitter comprising a resonance circuit comprising a capacitive impedance and an inductive impedance, the inductive impedance comprising a transmitter inductor for generating a power transfer signal for wirelessly transferring power to the power receiver; the method comprising:
generating a drive signal for the resonance circuit,
wherein the drive signal has a drive frequency;
aligning a resonance frequency of the resonance circuit with the drive frequency by slowing a state change for at least one of the capacitive impedance and the inductive impedance for a fractional time interval of each of at least a plurality of cycles of the drive signal,
generating a load estimate,
wherein the load estimate reflects an equivalent load resistor for the transmitter inductor,
wherein the equivalent load resistor reflects a loading of the power transfer signal; and
adapting the drive frequency in response to the load estimate;
wherein adapting the drive frequency comprises:
adapting the drive frequency to be a first distance away from a resonance frequency of a power receiving resonance circuit of the power receiver for a load estimate indicative of a first equivalent parallel load resistance, and
adapting the drive frequency to be a second distance away from a resonance frequency of a power receiving resonance circuit of the power receiver for a load estimate indicative of a second equivalent parallel load resistance,
wherein the first distance is greater than the second distance, and
wherein the first equivalent parallel load resistance is lower than the second equivalent parallel load resistance.

15. A wireless power transfer system comprising power transmitter and a power receiver, the power transmitter comprising:
a resonance circuit comprising a capacitive impedance and an inductive impedance, wherein the inductive impedance comprises a transmitter inductor,
wherein the transmitter inductor generates a power transfer signal for wirelessly transferring power to the power receiver;
a driver
wherein the driver generates a drive signal for the resonance circuit,
wherein the drive signal has a drive frequency;
a resonance modification circuit,
wherein the resonance modification circuit aligns the resonance frequency of the resonance circuit with the drive frequency by slowing a state change for at least one of the capacitive impedance and the inductive impedance for a fractional time interval of each of at least a plurality of cycles of the drive signal,
a load estimator,
wherein the load estimator generates a load estimate,
wherein the load estimate reflects an equivalent load resistor for the transmitter inductor,
wherein the equivalent load resistor reflects a loading of the power transfer signal; and
a drive frequency adapter,
wherein the drive frequency adaptor adapts the drive frequency in response to the load estimate;
wherein the drive frequency adapter adapts the drive frequency to be a first distance away from a resonance frequency of a power receiving resonance circuit of the power receiver for a load estimate indicative of a first equivalent parallel load resistance,
wherein the drive frequency adapter adapts the drive frequency to be a second distance away from a resonance frequency of a power receiving resonance circuit of the power receiver for a load estimate indicative of a second equivalent parallel load resistance,
wherein the first distance is greater than the second distance, and
wherein the first equivalent parallel load resistance is lower than the second equivalent parallel load resistance.

16. The power transmitter of claim 9, wherein the drive frequency adapter adapts the drive frequency within the operating range in response to an operating parameter other than the load estimate.

17. The power transmitter of claim 9, wherein the drive frequency adapter operates a feed-forward adaptation of the drive frequency in response to the load estimate, and operates a control loop adaptation of the drive frequency in response to an operating parameter other than the load estimate.

18. The power transmitter of claim 9, wherein the drive frequency adapter adapts the drive frequency in response to a power loss of the resonance circuit.

19. The power transmitter of claim 9, further comprising a modulation depth estimator,
wherein the modulation depth estimator determines a modulation depth estimate for a load modulation of the power transfer by the power receiver; and
wherein the drive frequency adapter adapts the drive frequency in response to the modulation depth estimate.

20. The power transmitter of claim 9, wherein a natural resonance frequency corresponding to the capacitive impedance and the inductive impedance exceeds a maximum allowable resonance frequency for the power receiver.

* * * * *